United States Patent [19]

Blanchard et al.

[11] Patent Number: 5,065,464

[45] Date of Patent: Nov. 19, 1991

[54] APPARATUS FOR TRANSFERRING A PATIENT BETWEEN PATIENT SUPPORT SURFACES

[75] Inventors: Frederick W. Blanchard, North Charleston; Thomas J. Moore, Charleston, both of S.C.

[73] Assignee: SSI Medical Services, Inc., Charleston, S.C.

[21] Appl. No.: 560,045

[22] Filed: Jul. 30, 1990

[51] Int. Cl.$^5$ .......................... A61G 7/10; B65G 7/06

[52] U.S. Cl. .......................................... 5/81 R; 5/453; 5/507; 180/125; 414/676

[58] Field of Search ............... 5/81 R, 81 B, 453, 454, 5/469, 423, 455, 456, 507; 180/124, 125, 116; 414/676

[56] References Cited

U.S. PATENT DOCUMENTS

| | | | |
|---|---|---|---|
| 2,582,439 | 1/1952 | Kavanagh | 5/455 |
| 2,919,747 | 1/1960 | Post | 5/457 |
| 3,762,404 | 10/1973 | Sakita | 5/449 |
| 3,948,344 | 4/1976 | Johnson et al. | 180/124 |
| 4,155,421 | 5/1979 | Johnson et al. | 180/125 |
| 4,272,856 | 6/1981 | Wegener et al. | 5/81 R |
| 4,298,083 | 11/1981 | Johnson et al. | 180/125 |
| 4,399,885 | 8/1983 | Johnson et al. | 180/125 |
| 4,417,638 | 11/1983 | Harvey | 180/125 |
| 4,417,639 | 11/1983 | Wegener | 180/125 |
| 4,517,690 | 5/1985 | Wegener | 5/81 R |
| 4,528,704 | 7/1985 | Wegener et al. | 5/81 R |
| 4,567,957 | 2/1986 | Johnson | 180/125 |
| 4,627,426 | 12/1986 | Wegener et al. | 5/487 |
| 4,686,719 | 8/1987 | Johnson et al. | 5/81 R |

*Primary Examiner*—Alexander Grosz

*Attorney, Agent, or Firm*—Dority & Manning

[57] ABSTRACT

A patient transfer apparatus includes an air bearing attached beneath an inflatable cushion which has peripheral chambers so that the peripheral portions fill before the central portions. A diverter valve enables the apparatus to tap into the pressurized air supply provided by a fluidized bed. A tri-fold patient transfer board has a pair of parallel spaced apart ribs extending in the longitudinal direction near the center line of each tri-fold section.

28 Claims, 4 Drawing Sheets

APPARATUS FOR TRANSFERRING A PATIENT BETWEEN PATIENT SUPPORT SURFACES

BACKGROUND OF THE INVENTION

The present invention relates to patient transfer devices and more particularly to a patient transfer apparatus which employs an air bearing to facilitate the transfer.

One class of device used for moving patients to and from a hospital bed, X-ray table, operating table, or the like employs a planar air pallet embodiment of an air-bearing. An air-bearing provides a layer of air between two surfaces and thereby facilitates movement of the surfaces relative to one another. Several examples of patient mover devices employing air bearings can be found in U.S. Pat. No. 4,528,704 to Wegener et al.

One Wegener et al embodiment includes a top sheet 12, a middle sheet 14, a bottom sheet 16, and a semi-rigid sheet 18. The top, middle, and bottom sheets are thin flexible sheets 12, 14, and 16, and may be formed of an electrically conductive sheet material which has a nylon scrim and a vinyl coating on both sides so as to embed the scrim within the vinyl. The thin flexible sheets 12, 14, and 16 are sewn together at predetermined positions to create sealed chambers or cavities. One such cavity 22 is formed between top sheet 12, and middle sheet 14, while a plenum chamber 24 is formed between middle sheet 14 and bottom sheet 16. The semi-rigid sheet may be a board 18 formed of plastic or the like. Board 18 is inserted into cavity 22 and extends less than the length and width of cavity 22 by about one-half inch to each side. Thousands of small pinhole-sized perforations 56 are formed in a portion of bottom sheet 16 and extend into plenum chamber 24. The gaps 40 between side edges **18*b* of semi-rigid sheet 18 and the sides of cavity 22 provide flexibility sufficient to produce pillowing of bottom sheet 16 inwardly of laterally spaced longitudinally extending stitching 30. Further, in the areas internally of stitchings 30, 32, and 34 defining plenum chamber 24, and externally of the modified diamond shaped area of perforations 56, bottom sheet 16 will pillow about the legs and about the shoulders and head of the patient tending to cradle the patient. This is particularly facilitated by the semi-rigid nature of sheet 18. Perforations 56 should underlie semi-rigid sheet 18 only, which functions to distribute the load over the air bearing. However, once the patient is moved and the air source disconnected, the patient rests against the semi-rigid sheet 18**. This can cause discomfort and distress to patients having sensitive skin conditions.

Another example of a patient mover is disclosed in FIG. 4 of U.S. Pat. No. 4,528,704 to Wegener et al and a series of individual tubes 72, 74 instead of semi-rigid sheet 18. Tubes 72, 74 are sealed along their longitudinal sides and at both ends to form sealed chambers 76, which may be pressurized to a relatively high pressure (5 to 25 psig) via suitable valves such as individual inner tube type valves 78 for each chamber 76. Thus, tubes 72, 74 are pressurized by a separate source than supplies air under pressure to plenum chamber 24. The high pressure air filled tubes 72, 74 are substantially rigid and thus form a generally rigid backing member intermediate of a patient and plenum chamber 24. However, the requirement for the availability of a second air source which is a source of high pressure air cannot always be met. Moreover, the provision of inner tube type valves 78 can cause a hazardous condition for a patient which has a sensitive skin condition (as would a burn patient or a patient suffering from bed sores). Furthermore, the high pressure air source needs to be applied to each chamber 76 individually, and this is time consuming. In addition, the sequential inflation of chambers 76 could influence the patient to roll off the tubes or otherwise discomfort the patient.

Yet another embodiment of a patient mover 10″ is shown in FIG. 5 of U.S. Pat. No. 4,528,704 to Wegener et al and includes a top sheet 12 which is typically formed of material that will be considerably thicker and more rigid than the material forming top sheets 12 of the other embodiments of this Wegener et al U.S. Pat. No. 4,528,704. A bottom sheet 16 bears perforations 56 and forms a plenum chamber 24 with a middle sheet 14. Top sheet 12 is sealed at laterally spaced positions along longitudinally straight lines as at 70 to form a plurality of relatively large diameter tubes 80, which individually or jointly receive a flow of low pressure, low CFM air through inlet 46 which opens directly to the interior 82 of a transverse manifold 83 leading into tubes 80 via tube inlets 46′. The low CFM air flows into one end of each tube 80 bearing the inlet 46 to its opposite end, wherein an outlet as at 84 is formed within middle sheet 14. Each outlet 84 for each tube 80 should be considerably smaller than its inlet 46 and opens directly to plenum chamber 24 for pressurization of plenum chamber 24. However, once the patient is moved and the air source disconnected because no longer needed for the air bearing, tubes 80 lose their supply of air and deflate. If the patient is left on the patient mover for any length of time after the air source is disconnected, the patient could develop bed sores if the patient mover rests on a hard surface. Moreover, all of tubes 80 fill simultaneously and could dislodge the patient from the surface of the top sheet and injure the patient.

OBJECTS AND SUMMARY OF THE INVENTION

It is a principal object of the present invention to provide an apparatus for transferring a patient from one support surface to another without endangering or unduly discomforting the patient during transfer.

It also is a principal object of the present invention to provide an apparatus for transferring a patient to and from a fluidized patient support without endangering or unduly discomforting the patient during the transfer.

Another principal object of the present invention is to provide an apparatus for transferring a patient to and from a fluidized patient support, wherein the air supply for the transfer apparatus is supplied by the same air supply used to fluidize the patient support.

Still another principal object of the present invention is to provide an apparatus for transferring a patient from one support surface to another without endangering or unduly discomforting the patient who remains on the apparatus subsequent to the transfer.

Yet another principal object of the present invention is to provide an apparatus for transferring a patient from one support surface to another, wherein means are provided for supporting the patient who remains on the apparatus for a substantial length of time subsequent to the transfer, on an air cushion maintained at therapeutic pressures to avoid the onset or aggravation of bed sores or other sensitive skin conditions of the patient.

A still further principal object of the present invention is to provide an apparatus for transferring a patient from one support surface to another without endangering or unduly discomforting the patient during or after the transfer, wherein means are provided for guarding against inadvertently rolling the patient off the edge of the transfer apparatus during any portion of the transfer operation, and especially at the beginning of the transfer operation.

Yet a further principal object of the present invention is to provide an apparatus for transferring a patient from one support surface to another without endangering or unduly discomforting the patient during or after the transfer, wherein the air flow used to inflate the transfer apparatus is baffled so that the peripheral portions of the transfer apparatus initially are the first to be pressurized and thus formed into an inflated boundary around the patient to guard against inadvertently rolling the patient off the edge of the transfer apparatus.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the patient transfer apparatus of the present invention includes an inflatable bladder. The bladder defines an inflatable enclosure which preferably is impervious to air and liquid. The bladder has an elongated shape with the sides being longer than the ends, which may be semicircular. The depth of the bladder is the smallest dimension. When fully inflated for the transfer operation, the bladder is pressurized preferably with air to a pressure in the range of about two pounds per square inch (psi).

The bladder can define a top member, a mid member, and a side portion. The mid member is disposed opposite the top member, and the side portion extends between and joins the top member to the mid member. Each of the top member, mid member, and side portion can be defined by individual sheets of material that are integrated to form the bladder. Each of the top member and mid member can define a flexible planar member. The flexible planar member of the top member defines an interior surface opposite an exterior surface. The flexible planar member of the mid member also defines an interior surface on one side thereof. Similarly, the side portion defines an interior surface, and the interior surfaces of the top member, mid member, and side portion are joined to define the enclosure within the bladder. Alternatively, the bladder can be formed of a continuous sheet of material such that the top member, mid member, and side portion form a unitary structure. In another alternative embodiment, the bladder can be formed such that the top member and mid member are formed of a topsheet and midsheet joined together at their peripheral edges, wherein the side portion encompasses the peripheral portions of the topsheet and midsheet in the vicinity where they join together to form the enclosure defined by the bladder.

In further accordance with the patient transfer apparatus of the present invention, the bladder further defines a plurality of webs, which are disposed to subdivide the bladder enclosure. Each bladder web defines an elongated planar member, which in turn defines a pair of opposed elongated side edges and a pair of opposed end edges which extend between and join the elongated side edges. The end edges are shorter than the side edges. Each bladder web extends between the interior surface of the top member and the interior surface of the mid member. One of the elongated side edges of each bladder web is connected to the interior surface of the top member, and the other of the elongated side edges of the bladder web is connected to the interior surface of the mid member. A plurality of holes are defined through the elongated planar member that defines each bladder web.

In yet further accordance with the patient transfer apparatus of the present invention, one of the bladder webs defines a peripheral web. The peripheral web is disposed within the bladder enclosure and adjacent and spaced from at least a part of the side portion that defines the bladder. The peripheral web defines a peripheral bladder chamber between the peripheral web, the side portion, the top member in the vicinity of the side portion, and the mid member in the vicinity of the side portion. Thus, the peripheral web subdivides the enclosure of the bladder into two separate chambers, a peripheral bladder chamber and a surrounded bladder chamber. The perimeter of the peripheral bladder chamber surrounds at least about three quarters of the perimeter of the so-called surrounded (or enclosed) bladder chamber. In some embodiments, the peripheral web member can form a closed loop in which the end edges join to one another. In this closed loop embodiment, the peripheral bladder web completely surrounds the surrounded bladder chamber.

In still further accordance with the patient transfer apparatus of the present invention, at least one of the bladder webs defines a bladder dividing web. Each bladder dividing web has at least one of its end edges connected to the peripheral web. Each bladder dividing web can be disposed to divide the surrounded chamber into a pair of adjacent bladder support channels existing within the surrounded chamber of the bladder. Preferably, a plurality of bladder dividing webs are disposed side-by-side and parallel to one another to subdivide the surrounded chamber into a plurality of bladder support channels. In the embodiment in which the peripheral web forms a closed loop, each end of each bladder dividing web is connected to a different, and generally opposed, section of the peripheral web.

In further accordance with the patient transfer apparatus of the present invention, the bladder further defines an opening into the peripheral bladder chamber. The bladder opening provides means to introduce air into the bladder enclosure so as to inflate the bladder. The bladder opening preferably is defined through the side portion and permits access directly into the peripheral bladder chamber. The holes that are defined through the peripheral bladder web are preferably disposed in the portions of the peripheral web that are located away from the vicinity of the bladder opening.

In yet further accordance with the patient transfer apparatus of the present invention, a bladder valve is provided. The bladder valve covers the bladder opening and selectively controls access between the peripheral bladder chamber and the environment of the patient transfer apparatus. The bladder valve preferably is of the check valve type and so includes a valve head which is biased to seal the bladder opening. The check valve permits the air pressure in the bladder to be reduced from the two psi level used during the transfer operation to a therapeutic pressure level of about 8 to 10 inches of standard water used when the patient is resting on the bladder for any length of time before or after the transfer operation.

In still further accordance with the patient transfer apparatus of the present invention, means are provided for defining an air bearing. The air bearing means preferably is secured to one side of the bladder on the outside of the bladder enclosure. The air bearing means preferably is connected to the exterior surface of the bladder mid member and is similarly configured to the bladder in both size and shape. As embodied herein, the air bearing means preferably includes a plenum that defines an enclosure. The plenum enclosure defines a plurality of small perforations through which air can pass from within the plenum enclosure to the atmosphere surrounding the patient transfer apparatus. Each perforation has a diameter of about 0.030 inches.

The plenum enclosure preferably is impervious to liquid as well as air. The plenum has an elongated shape with sides being longer than the ends. The depth of the plenum is the smallest dimension. The plenum can define a bottom member, a mid member, and a side portion. The mid member is disposed opposite the bottom member, and the side portion extends between and joins the bottom member to the mid member. Each of the bottom member, plenum mid member, and plenum side portion can be defined by individual sheets of material that are integrated to form the plenum. Each of the bottom member and mid member define a flexible planar member. The flexible planar member of the bottom member defines an inner surface opposite an exterior surface. The flexible planar member of the plenum mid member also defines an inner surface on one side thereof. Similarly, the plenum side portion defines an inner surface, and the inner surfaces of the bottom member, mid member, and side portion are joined to define the enclosure within the plenum. Alternatively, the plenum can be formed of a continuous sheet of material such that the bottom member, mid member, and side portion form a unitary structure. In another alternative embodiment, the plenum can be formed such that the bottom member and mid member are formed of a bottom sheet and midsheet joined together at their peripheral edges, wherein the side portion encompasses the portions of the bottom sheet and midsheet in the vicinity where they join together to form the enclosure of the plenum.

In some embodiments, the plenum mid member and the bladder mid member define one and the same member, such as a single planar sheet of material. In such common mid member embodiments, one side of the mid member can define the inner surface of the plenum, and the opposite side of the mid member can define the interior surface of the bladder.

In further accordance with the patient transfer apparatus of the present invention, the plenum further defines a plurality of webs within the plenum enclosure. Each plenum web can define an elongated planar member, which in turn defines a pair of opposed elongated side edges and a pair of opposed end edges which extend between and join the elongated side edges. The end edges are shorter than the side edges. Each plenum web extends between the inner surface of the bottom member and the inner surface of the plenum mid member. One of the elongated side edges of each plenum web is connected to the inner surface of the bottom member, and the other of the elongated side edges of the plenum web is connected to the inner surface of the plenum mid member. A plurality of holes are defined through the elongated planar member that defines each plenum web. Preferably, the holes are evenly spaced apart from one another along the elongated dimension of each plenum web.

In still further accordance with the patient transfer apparatus of the present invention, one of the plenum webs defines a right peripheral web, which is disposed to one side of the plenum enclosure. The right peripheral web is disposed adjacent and spaced from the plenum side portion. One of the end edges of the right peripheral web is connected to the side portion of the plenum at one section of the side portion, while the other end edge of the right peripheral web is connected to the side portion of the plenum at a second section of the side portion. The side edges of the right peripheral web are connected to the opposed inner surfaces of the plenum enclosure's bottom member and mid member so as to define an enclosed right peripheral plenum channel. Thus, a right peripheral plenum channel is defined between the right peripheral web, the bottom member, the mid member, and the plenum side portion that is defined between a first section and a second section of the side portion.

In further accordance with the patient transfer apparatus of the present invention, one of the plenum webs defines a left peripheral web, which is disposed to one side of the plenum enclosure. The left peripheral web is disposed adjacent and spaced from the plenum side portion. One of the end edges of the left peripheral web is connected to the side portion of the plenum at a third section of the plenum side portion, while the other end edge of the left peripheral web is connected to the side portion of the plenum at a fourth section of the side portion. The side edges of the left peripheral web are connected to the opposed inner surfaces of the plenum enclosure's bottom member and mid member so as to define an enclosed left peripheral plenum channel. Thus, a left peripheral plenum channel is defined between the left peripheral web, the bottom member, the mid member, and the side portion that is defined between a third section and a fourth section of the side portion.

In yet further accordance with the patient transfer apparatus of the present invention, at least one of the plenum webs defines a plenum dividing web. Each plenum dividing web is disposed generally parallel to and between the right and left peripheral webs. The volume of the plenum enclosure defined between the right peripheral plenum channel and the left peripheral plenum channel defines a middle plenum channel. Each plenum dividing web can be disposed to divide the middle plenum channel into a pair of adjacent plenum support channels existing within the middle channel of the plenum. Preferably, only a single plenum dividing web is provided. Each plenum dividing web preferably has only one of its end edges connected to a fifth section of the plenum side portion's inner surface.

In still further accordance with the patient transfer apparatus of the present invention, a plenum opening is provided. The plenum opening preferably is defined through the side portion of the plenum enclosure and opens into the middle plenum channel. Preferably two plenum openings are provided, one on each side of one end of the plenum. With the exception of the perforations through the plenum enclosure and the plenum enclosure openings, the plenum enclosure is impervious to the passage of air.

In accordance with the patient transfer apparatus of the present invention, a plenum valve can be provided. The plenum valve preferably is a conventional check valve which is disposed in the plenum opening. The check valve permits the plenum to be inflated by insertion of a suitable fitting into the check valve. When the fitting is removed, the check valve closes and prevents unwanted dust, particles, or other debris from gaining access to the plenum enclosure through the plenum opening. Accordingly, the plenum valve selectively controls access between the inside of the plenum and the environment of the patient transfer apparatus.

Alternatively, a plenum coupling and associated sealing cap can be provided for each plenum opening. The plenum coupling is a fitting which surrounds the plenum opening. The plenum sealing cap can attach in air tight fashion to its associated coupling and thereby covers the plenum opening and selectively controls access between the surrounding chamber of the plenum and the environment of the apparatus. The plenum sealing cap can include a threaded cap which can be screwed onto a mating set of threads defined in the coupling.

In still further accordance with the patient transfer apparatus of the present invention, a plurality of perforations is defined through the bottom member of the plenum. The perforations are disposed to connect the middle plenum channel with the atmosphere surrounding the plenum. The pattern of disposing the perforations around the bottom member is determined by the footprint of support that is desired to enable the air bearing means to form an air bearing capable of reducing the friction between the plenum bottom member and its resting place. The reduction in friction must suffice to enable the patient transfer apparatus to slide over the surface forming the resting place of the patient transfer apparatus. Typically, the portion of the plenum bottom member defining the perforations will be that portion disposed away from the peripheral edges of the bottom member and toward the central region of the bottom member. However, the bottom member also defines some perforations into each of the right peripheral plenum channel and the left peripheral plenum channel. The pattern of perforations preferably forms a square grid pattern in which the center of adjacent perforations on the side of the squares are separated by a linear distance that typically is about 0.375 inches (three-eighths of an inch). Each perforation typically has a diameter of about 0.030 inches.

In further accordance with the patient transfer apparatus of the present invention, means are provided for bridging the edge of the tank of a fluidized patient support. As embodied herein, the bridging means preferably includes a rigid elongated member that defines a planar surface on two opposite sides of the rigid member. In addition, a pair of elongated rib members are disposed on one of the planar surfaces of the rigid elongated member. Each rib member is raised above the level of the planar surface on which the rib member is disposed. Each rib member is disposed to extend in the direction of elongation of the rigid elongated member. Moreover, the rib members are disposed parallel to each other and spaced apart near the centerline of the rigid elongated member. The spacing between the rib members should be greater than the thickness of the free edge of the tank to be bridged.

In an alternative embodiment of the bridging means, the rigid elongated member is formed in at least two segments that are joined by a flexible joint which extends transversely relative to the longitudinal axes of the segments comprising the rigid elongated member. Preferably, three rigid, flat panels are disposed side-by-side, with two end panels, one on each side of a middle panel. The panels are completely encapsulated in a flexible material such as a laminate vinyl-synthetic fabric which has an antibacterial agent. The rigid panels are preferably formed of a shatterproof board of high strength and durability. The edges of the boards are smoothed. In addition, the peripheral seams of the encapsulating material can be welded, and the welded seams disposed between adjacent boards to form flexible hinges. Moreover, foam inserts can be provided around the peripheral edges of the stiff boards. Furthermore, a fabric cloth of nylon twill can be disposed onto one side of the full length of the encapsulated boards and can be secured to the boards by snaps, which can be provided along one of the planar surfaces of each board near a single free edge thereof. In this segmented board embodiment, each rib member can terminate at points which are coextensive with the edges of each individual board segment. Each rib member can be formed of a closed cell foam or a natural rubber.

In still further accordance with the patient transfer apparatus of the present invention, means are provided for selectively connecting one of the bladder and the plenum to a source of pressurized air. As embodied herein, the selective connecting means preferably includes a flexible hose, a plenum coupling secured around each plenum opening, a bladder coupling secured to the bladder valve, and a first fitting that is secured to one end of the hose. The first fitting preferably is configured so as to be removably and separately connectable in air tight fashion to each of the plenum coupling and the bladder coupling.

In still further accordance with the patient transfer apparatus of the present invention, the selective connecting means also can include a diverter valve for diverting the flow of pressurized air from a fluidized patient support apparatus to an outlet of the diverter valve. In this embodiment, a diverter valve coupling also is required and is connected to the outlet of the diverter valve. As embodied herein, the diverter valve is mounted on the fluidized patient support apparatus in the vicinity of a conduit which leads from the source of pressurized air to a plenum disposed beneath a diffuser board which supports the mass of fluidizable material in the fluidized patient support apparatus. The diverter valve also includes a spring-loaded piston disposed in a tube defining a central branch of a valve body and having an outlet at one end. The opposite end of the central branch is connected to the plenum of the fluidized patient support apparatus. The valve body also defines a second tube branch which is connected at one end to the conduit leading to the source of pressurized air for the fluidized patient support apparatus. The opposite end of the second branch is connected to the central branch and is disposed between the outlet end of the central branch and the opposite end of the central branch which connects to the plenum of the fluidized patient support.

In addition, a diverter valve fitting is secured to the opposite end of the flexible hose. The diverter valve fitting is configured to activate the diverter valve so as to divert the flow of pressurized air from the fluidizing air source of a fluidized patient support apparatus that is connected to the diverter valve, to an outlet of the diverter valve upon insertion of the diverter valve fitting into the diverter valve. As embodied herein, the diverter valve fitting includes an elongated tube which has a plurality of large openings defined transversely through the wall of the tube relative to the central longitudinal axis of the elongated tube. When the diverter valve tube is inserted into the outlet of the diverter valve, the free end of the tube displaces the piston against a resilient biasing mechanism, such as a spring, so as to move the piston past the opening of the second branch into the central branch and dispose the large openings in the diverter valve tube so that these large openings are in communication with the opening of the second branch into the central branch. So disposed, the piston prevents air from the pressurized source from travelling to the plenum of the fluidized patient support apparatus and diverts this pressurized air to the outlet of the diverter valve. Thus, the source of pressurized air is connected to the flexible hose via the opening of the second branch into the central branch and the openings in the wall of the diverter valve tube.

The diverter valve fitting also is configured so that it can be either selectively locked into the diverter valve coupling and prevented from withdrawing from same, or unlocked from the coupling and withdrawn from same, as desired.

In yet further accordance with the patient transfer apparatus of the present invention, means are provided for positively securing a patient above the exterior surface of the bladder. As embodied herein, the positive patient securement means preferably includes at least a first strap that has one end secured to the exterior of the bladder. A second strap also has one end secured to the exterior of the bladder. The sites for securing the ends of the straps to the exterior of the bladder are disposed preferably opposite one another along the elongated sides of the top member of the bladder. The free ends of the straps each contain securement means, such as hook and loop-type fasteners, so as to be securable to each other.

In yet further accordance with the patient transfer apparatus of the present invention, means are provided for manual gripping and lifting of the patient transfer apparatus when the patient is being transferred by the apparatus. The manual gripping and lifting means preferably is secured to the bladder and is configured to easily and comfortably accommodate the grip of a human hand. As embodied herein, the manual gripping and lifting means preferably includes at least one handle that defines a flexible member. The handles can be made of cloth, heavy canvas, etc. Opposite ends of the flexible member defining the handle are secured preferably where the bladder joins to the plenum. In this way, the handle defines a generally semicircular shape. Preferably, two such handles are provided along each elongated side of the patient transfer apparatus.

The accompanying drawings, which are incorporated in and constitute a part of this specification, illustrate embodiments of the invention and, together with the description, serve to explain the principles of the invention.

DETAILED DESCRIPTION OF THE PREFERRED EMBODIMENTS

Reference now will be made in detail to the present preferred embodiments of the present invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover the modifications and variations of this invention provided they come within the scope of the appended claims and their equivalents.

Figure 1:
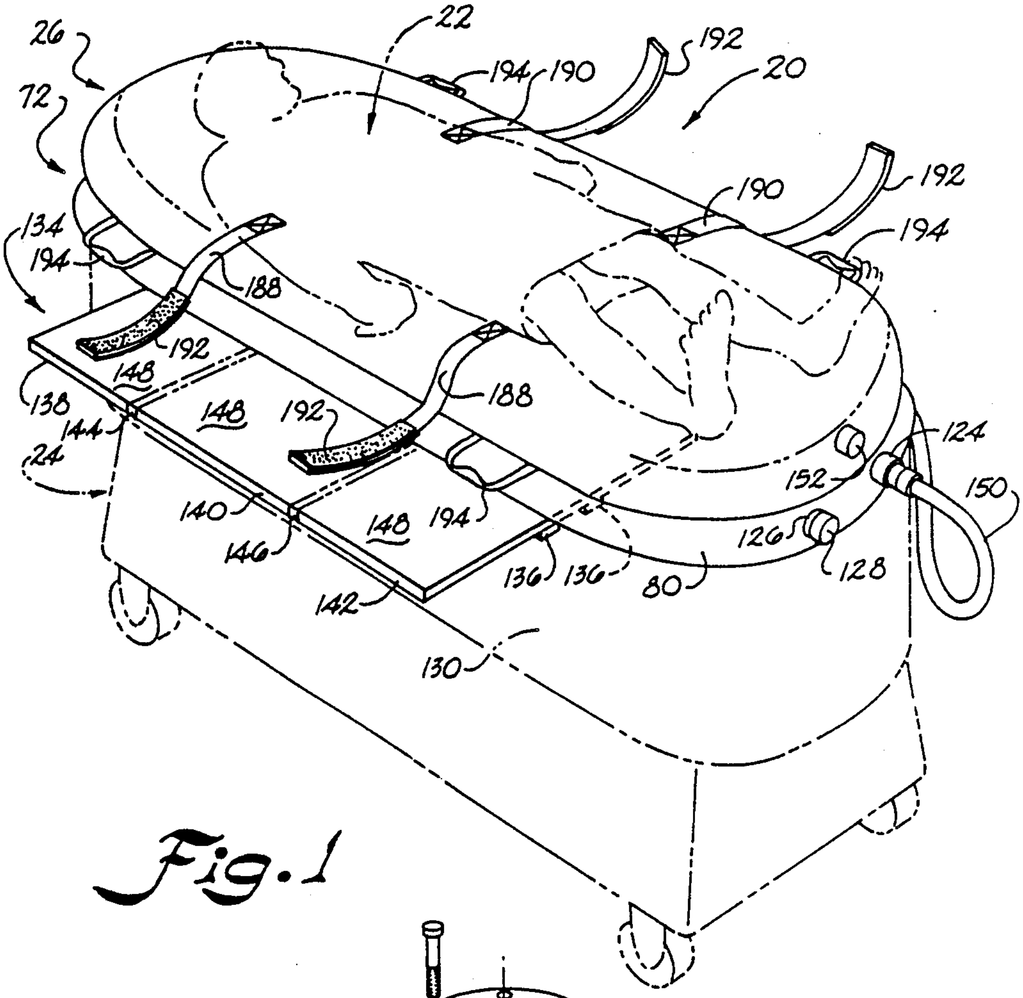
FIG. 1 illustrates a preferred embodiment of the patient transfer apparatus of the present invention from an elevated perspective view with a patient shown in phantom atop the apparatus and a fluidized patient support system schematically shown in phantom beneath the patient transfer apparatus.

A preferred embodiment of the patient transfer apparatus of the present invention is shown in FIG. 1 and is represented generally by the numeral 20. A patient 22 is shown in phantom by dashed lines, and apparatus 20 is shown resting atop a fluidized patient support apparatus, which is also shown in phantom by dashed lines and indicated generally by the designating numeral 24. The opposed, transverse ends of patient transfer apparatus 20 are provided with a rounded shape rather than a squared shape, which reduces the volume of the apparatus and accordingly the amount of materials required to form it and the size of the air supply required to operate it.

In accordance with the apparatus of the present invention for transferring a patient, an inflatable bladder is provided. The bladder defines an inflatable enclosure which preferably is impervious to air and liquid. The bladder has an elongated shape with the sides being longer than the ends, which may be semicircular. The depth of the bladder is the smallest dimension. Typical dimensions for the bladder when fully inflated would be about 70 inches along the elongated centerline of the bladder, about 20 inches in the direction transverse to the elongated centerline of the bladder, and a depth of about 3 inches. When fully inflated for the transfer operation, the bladder is pressurized preferably with air to a pressure in the range of about two pounds per square inch (psi).

Figures 2, 3, 4:
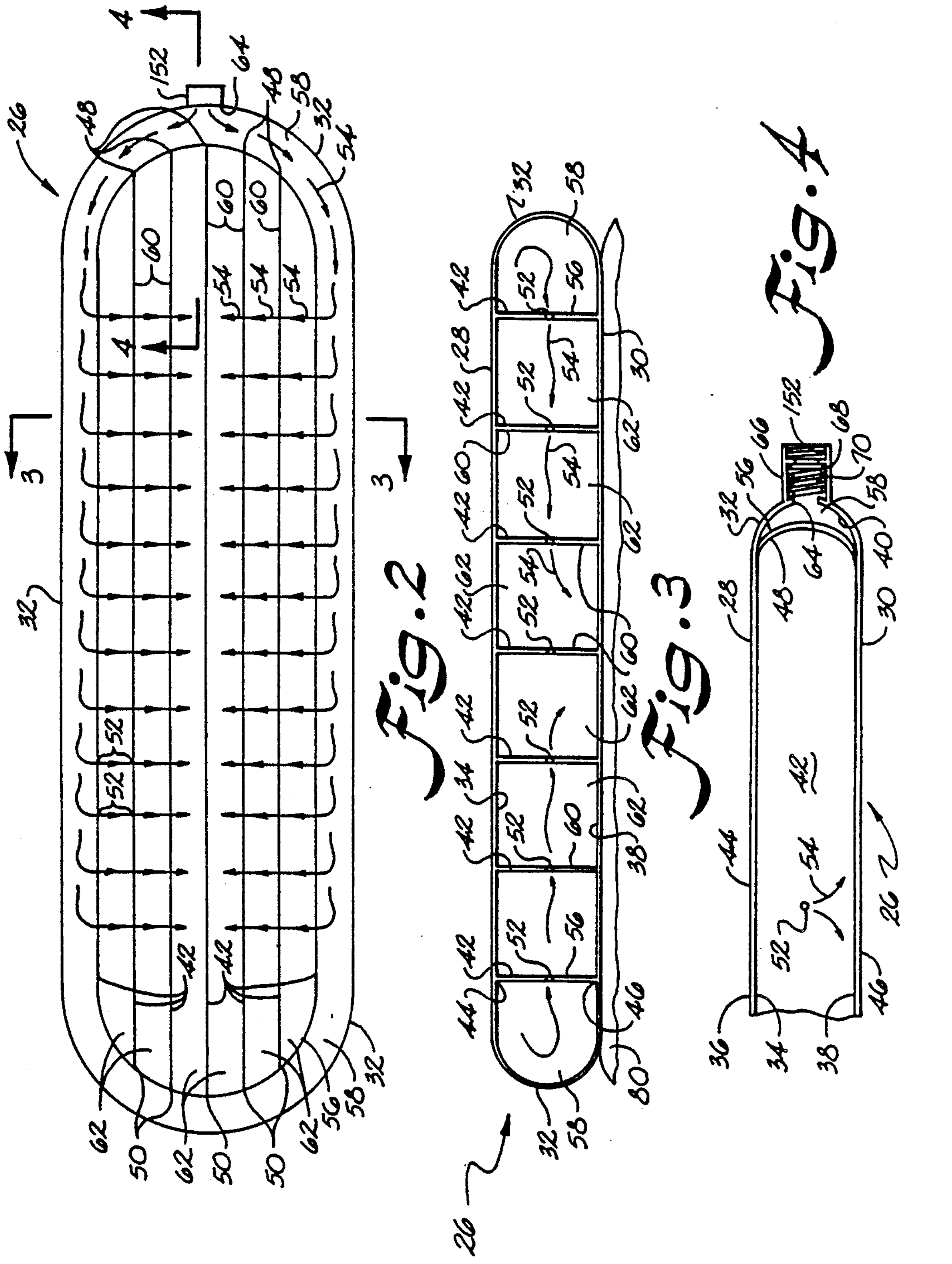
FIG. 2 illustrates a schematic plan view of the bladder component of a preferred embodiment of the patient transfer apparatus from the perspective that would be seen if the top member or mid member of the bladder were removed to reveal the internal structure.
FIG. 3 illustrates a cross-sectional view taken along the line of sight indicated by the direction in which arrows 3—3 are pointed in FIG. 2.
FIG. 4 illustrates a cross-sectional view taken along the line of sight indicated by the direction in which arrows 4—4 are pointed in FIG. 2.

As embodied herein and shown in FIGS. 1–4 for example, a bladder is designated generally by the numeral 26. As shown in FIGS. 1, 2 and 4 for example, the opposed, transverse ends of bladder 26 are provided with a rounded shape rather than a squared shape. As embodied herein and shown in FIGS. 3 and 4 for example, a bladder 26 can define a top member 28, a mid member 30, and a side portion 32. The mid member is disposed opposite the top member, and the side portion extends between and joins the top member to the mid member. Each of the top member, mid member, and side portion can be defined by individual sheets of material that are integrated to form the bladder as by adhesive, sewing, heat sealing, etc. Each of the top member and mid member can define a flexible planar member, which can be formed of a polyurethane coated nylon material. As shown in FIG. 4 for example, the flexible planar member of top member 28 defines an interior surface 34 opposite an exterior surface 36. The flexible planar member of mid member 30 also defines an interior surface 38 on one side thereof. Similarly, side portion 32 defines an interior surface 40, and the interior surfaces of the top member, mid member, and side portion are joined to define an enclosure within the bladder. Alternatively, as shown in FIGS. 3 and 4 for example, bladder 26 can be formed of a continuous sheet of material such that top member 28, mid member 30, and side portion 32 form a unitary structure. In another alternative embodiment (not shown), the bladder can be formed such that the top member and mid member are formed of a topsheet and midsheet joined together at their peripheral edges, as by adhesive, sewing, heat sealing, etc., wherein the side portion encompasses the peripheral portions of the topsheet and midsheet in the vicinity where they join together to form the enclosure defined by the bladder.

In further accordance with the patient transfer apparatus of the present invention, the bladder further defines a plurality of webs, which are disposed to subdivide the bladder enclosure. As embodied herein and shown in FIGS. 2–4 for example, each bladder web 42 in general defines an elongated planar member, which in turn defines a pair of opposed elongated side edges 44, 46 (FIG. 3) and a pair of opposed end edges 48, 50 (FIG. 2) which extend between and connect elongated side edges 44, 46. End edges 48, 50 are shorter than side edges 44, 46. Each bladder web 42 extends between interior surface 34 of top member 28 and interior surface 38 mid member 30. One of the elongated side edges 44, 46 of each bladder web is connected to the interior surface of the top member, and the other of the elongated side edges 44, 46 of the bladder web is connected to the interior surface of the mid member. A plurality of holes 52 are defined through the elongated planar member that defines each bladder web 42. Each bladder web hole 52 preferably has a diameter of about 0.375 inches. Each bladder web preferably is formed of the same material as the top member, the mid member, and the side portion.

In yet further accordance with the patient transfer apparatus of the present invention, one of the bladder webs defines a peripheral bladder web. As embodied herein and shown in FIGS. 2–4 for example, a peripheral bladder web 56 is disposed within the bladder enclosure and adjacent and spaced from at least a part of the side portion that defines the bladder. Peripheral bladder web 56 defines a peripheral bladder chamber 58 between the peripheral web, the side portion, the top member in the vicinity of the side portion, and the mid member in the vicinity of the side portion. Thus, the peripheral web subdivides the enclosure of the bladder into two separate chambers. One of the two chambers is peripheral bladder chamber 58, which is defined to the outside of peripheral bladder web 56. The other of the two bladder chambers is defined to the inside of peripheral bladder web 56. The perimeter of the peripheral bladder chamber surrounds at least about three quarters of the perimeter of the other of the two bladder chambers, the latter being the so-called surrounded (or enclosed) bladder chamber. In the embodiments shown in FIGS. 2–4 for example, peripheral bladder web 56 extends continuously to form a closed loop in which the end edges of the web join to one another. In such closed loop embodiments, the peripheral bladder web completely surrounds the surrounded bladder chamber. Thus, in such closed loop embodiments, the peripheral bladder chamber completely surrounds the surrounded (or enclosed) bladder chamber.

In still further accordance with the patient transfer apparatus of the present invention, at least one of the bladder webs defines a bladder dividing web. As embodied herein and shown in FIGS. 2 and 3 for example, a plurality of bladder dividing webs 60 can be provided. As shown in FIG. 2 for example, each bladder dividing web 60 can have at least one of its end edges 48 connected to a section of peripheral bladder web 56. As shown in FIGS. 2 and 3 for example, each bladder dividing web can be disposed to divide the so-called surrounded bladder chamber into a pair of adjacent bladder support channels 62 existing within the surrounded chamber of the bladder. Preferably, a plurality of bladder dividing webs 60 are disposed side-by-side and parallel to one another to subdivide the surrounded chamber into a plurality of bladder support channels 62. In a bladder having a transverse width of about 20 inches and a closed loop peripheral bladder web for example, about 6 bladder support channels 62 surrounded by peripheral bladder chamber 58 have been found satisfactory. In an embodiment such as shown in FIG. 2 in which the peripheral web forms a closed loop, each end edge 48, 50 of each bladder dividing web 60 is connected to a different, and generally opposed, section of peripheral bladder web 56. One end edge of the bladder dividing web would be connected to a first section of the peripheral web, and the other end edge of the dividing web would be connected to an oppositely disposed second section of the peripheral bladder web. Each of the individual sections of the peripheral bladder web involved in connecting to an end edge of a bladder dividing web, is likely to be a very narrow section because of the minimal thickness (typically about three thousandths of an inch) of the flat planar member which defines the bladder dividing web. Each bladder web can be connected as required to the top and mid members and side portion of the bladder by adhesives, heat sealing, sewing, etc.

In further accordance with the patient transfer apparatus of the present invention, the bladder further defines an opening into the peripheral bladder chamber. The bladder opening provides means to introduce air into the bladder enclosure so as to inflate the bladder. As embodied herein and shown in FIGS. 2 and 4 for example, a bladder opening 64 preferably is defined through side portion 32 and permits access directly into peripheral bladder channel 58. Preferably, bladder opening 64 is defined symmetrically about the longitudinal central axis of bladder 26 at one end of bladder 26, as shown for example in FIGS. 1 and 2. As shown in FIGS. 2–4 for example, a plurality of arrows 54 indicates the path of air throughout bladder 26 during inflation of same.

Moreover, as shown in FIG. 2 for example, bladder web holes 52, which are defined through peripheral bladder web 56, are preferably disposed in the sections of the peripheral web that are located away from the vicinity of the bladder opening. The provision of holes 52 in peripheral bladder web 56 at locations which are relatively remote from bladder opening 64, ensures that air entering bladder 26 through opening 64 initially inflates peripheral bladder chamber 58 before inflating bladder support channels 62. This inflation sequence transforms the peripheral bladder chamber portion of bladder 26 into a sort of bolster around the perimeter of the bladder during the initial inflation of the bladder. Such bolster helps guard against the patient situated atop top member 28 of bladder 26 during inflation of the bladder from being jostled toward the perimeter of the bladder by a sudden introduction of pressurized air into bladder channels 62 disposed beneath the patient. Instead, the initial filling of peripheral bladder chamber 58 is likely to bias the position of the patient toward the center of the bladder and away from the periphery of the bladder.

In yet further accordance with the patient transfer apparatus of the present invention, a bladder valve is provided. The bladder valve covers the bladder opening and selectively controls access between the peripheral (i.e., surrounding) bladder chamber and the environment of the patient transfer apparatus. As embodied herein and shown in FIG. 4 for example, a bladder valve 66 is of the check valve type and so includes a valve head 68 which is biased, as by a spring 70 for example, to seal bladder opening 64. The check valve permits the air pressure in the bladder to be reduced from the two psi level used during the transfer operation, to a therapeutic pressure level of about 8 to 10 inches of standard water. The therapeutic pressure level is used when the patient is resting on the bladder for any length of time before or after the transfer operation.

Figure 5:
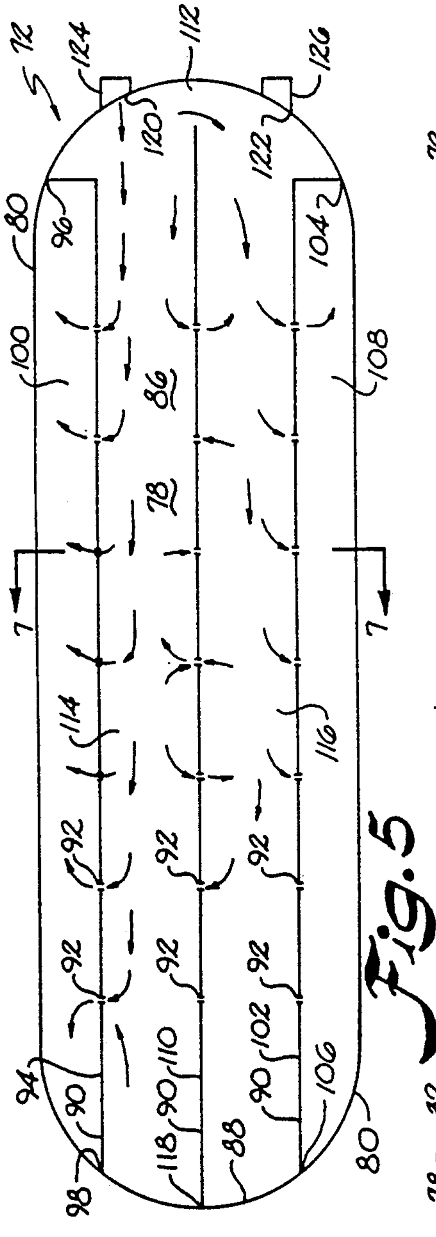
FIG. 5 illustrates a schematic plan view of the plenum component of a preferred embodiment of the patient transfer apparatus from the perspective that would be seen if the bottom member were removed and one were looking into the internal structure of the plenum at the inner surfaces.
Figure 7:
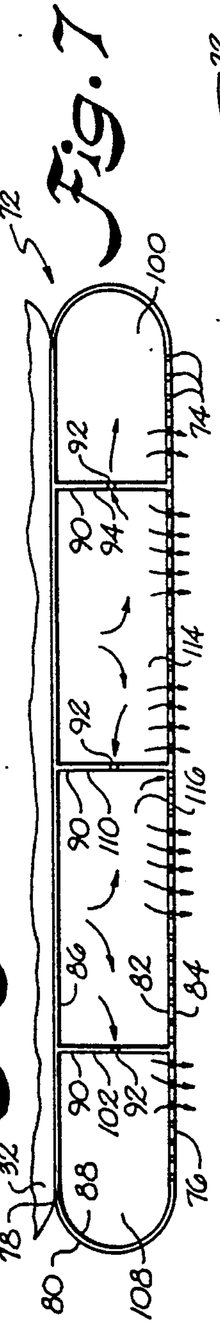
FIG. 7 illustrates a cross-sectional view taken along the line of sight indicated by the direction in which arrows 7—7 are pointed in FIG. 5.
Figure 6:
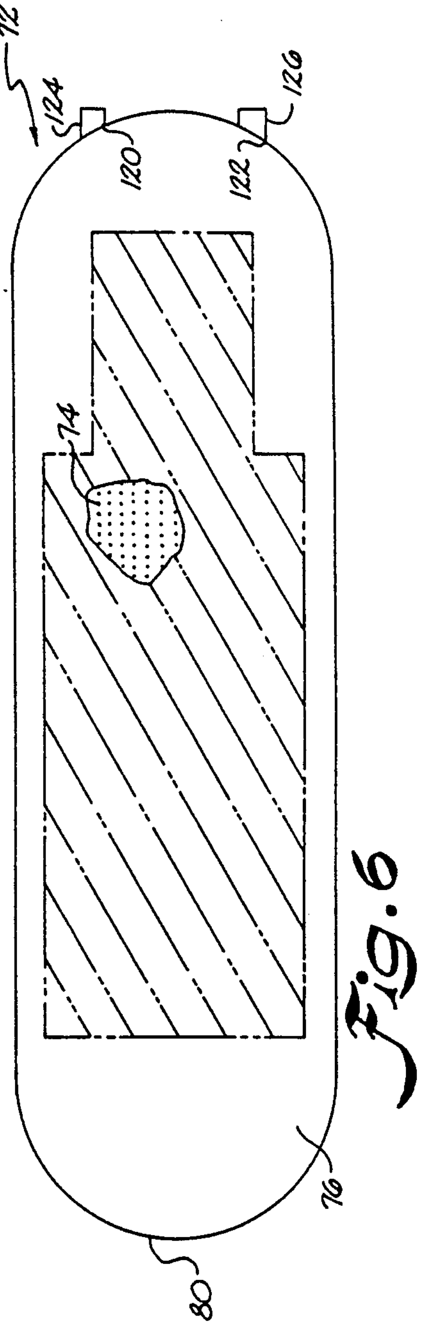
FIG. 6 illustrates a schematic plan view of the plenum component of a preferred embodiment of the patient transfer apparatus from the perspective that would be seen if one were looking at the exterior surface of the bottom member of the plenum component and including an expanded detailed close-up section showing the pattern of perforations in the larger area in which the perforations are disposed.

In still further accordance with the patient transfer apparatus of the present invention, means are provided for defining an air bearing. The air bearing means preferably is secured to one side of the bladder on the outside of the bladder enclosure. The air bearing means preferably is connected to the exterior surface of the bladder mid member and is similarly configured to the bladder in both size and shape. As embodied herein and shown in FIGS. 1 and 5–7 for example, the air bearing means preferably includes a plenum that is generally designated by the numeral 72 and defines an inflatable enclosure. As shown in FIGS. 6 and 7 for example, the plenum enclosure defines a plurality of small perforations 74 through which air can pass from within the plenum enclosure to the atmosphere surrounding the patient transfer apparatus. Each plenum perforation 74 has a diameter of about 0.030 inches. Air forced out of plenum perforations 74 under pressure forms a layer of air between the plenum and the surface on which the plenum is resting and accordingly reduces the friction between the plenum and this underlying resting surface.

The plenum enclosure preferably is impervious to liquid as well as air. The plenum has an elongated shape with sides being longer than the ends. The depth of the plenum is the smallest dimension. When the plenum is fully inflated with air, typical dimensions for the plenum would be 70 inches along the elongated centerline of the plenum, 20 inches in the transverse direction to the elongated centerline of the plenum, and a depth of about 2 inches. As shown in FIG. 7 for example, plenum 72 can define a bottom member 76, a mid member 78, and a side portion so. Mid member 78 is disposed opposite bottom member 76, and side portion 80 extends between and joins the bottom member to the mid member. Each of the bottom member, mid member, and side portion can be defined by individual sheets of material that are integrated to form the plenum as by sewing, heat sealing, etc. Each of the bottom member and mid member define a flexible planar member, which can be formed of a polyurethane coated nylon material. As shown in FIG. 7 for example, the flexible planar member of the bottom member can define an inner surface 82 opposite an exterior surface 84. The flexible planar member of the mid member also defines an inner surface 86 on one side thereof. Similarly, the side portion defines an inner surface 88, and the inner surfaces of the bottom member, mid member, and side portion are joined to define the enclosure within the plenum. Alternatively, and as shown in FIG. 7 for example, the plenum can be formed of a continuous sheet of material such that the bottom member, mid member, and side portion form a unitary structure. In another alternative embodiment (not shown in the drawings), the plenum can be formed such that the bottom member and mid member are formed of a bottom sheet and midsheet joined together at their peripheral edges, as by sewing, heat sealing, etc., wherein the side portion encompasses the portions of the bottom sheet and midsheet in the vicinity where they join together to form the enclosure of the plenum.

In some additional embodiments of the present invention, the mid member of the plenum and the mid member of the bladder can define one and the same member, such as a single planar sheet of material. In such common mid member embodiments, one side of the mid member defines inner surface 86 of plenum 72, and the opposite side of the mid member defines interior surface 38 of bladder 26. Moreover, this common mid member can form part of a unitary bladder or form part of a unitary plenum.

In further accordance with the patient transfer apparatus of the present invention, the plenum further defines a plurality of webs within the plenum enclosure. As embodied herein and shown in FIGS. 5 and 7 for example, each plenum web 90 defines an elongated planar member, which in turn defines a pair of opposed elongated side edges and a pair of opposed end edges which extend between and join the elongated side edges. The end edges are shorter than the side edges. As shown in FIG. 7 for example, each plenum web 90 extends between inner surface 82 of bottom member 76 and inner surface 86 of mid member 78. One of the elongated side edges of each plenum web can be connected to the inner surface of the bottom member, and the other of the elongated side edges of the plenum web can be connected to the inner surface of the mid member. As shown in FIGS. 5 and 7 for example, a plurality of plenum web holes 92 are defined through the elongated planar member that defines each plenum web 90. Preferably, as shown in FIG. 5 for example, plenum web holes 92 are evenly spaced apart from one another along the elongated dimension of each plenum web. The diameter of each plenum web hole 92 is about 0.375 inches, and about seven such plenum web holes are provided along the length of each plenum web in an embodiment of the plenum measuring about 70 inches in length along its longitudinal centerline. Moreover, the spacing between adjacent plenum web holes 92 along each plenum web 90 is preferably about 7 inches, and plenum web holes 92 of adjacently parallel plenum webs 90 preferably are aligned transversely as shown in FIG. 5 for example.

In still further accordance with the patient transfer apparatus of the present invention, one of the plenum webs defines a right peripheral plenum web, which is disposed to one side of the plenum enclosure. As embodied herein and shown in FIGS. 5 and 7 for example, a right peripheral plenum web 94 is disposed adjacent and spaced from side portion 80 of plenum 72. As shown in FIG. 5 for example, one of the end edges of right peripheral plenum web 94 is connected to side portion 80 of plenum 72 at a first section 96 of the side portion, while the other end edge of the right peripheral web is connected to the side portion of the plenum at a second section 98 of the side portion. Both first section 96 and second section 98 of plenum side portion 80 are on inner surface 88 of side portion 80. As shown in FIG. 7 for example, the elongated side edges of the right peripheral web are connected to the opposed inner surfaces of the plenum enclosure's bottom member 76 and mid member 78 so as to define an enclosed right peripheral plenum channel 100. Thus, as shown in FIG. 7 for example, right peripheral plenum channel 100 is defined between right peripheral plenum web 94, bottom member 76, mid member 78, and a segment of side portion 80 that is defined between first section 96 and second section 98 of the plenum side portion.

In further accordance with the patient transfer apparatus of the present invention, one of the plenum webs defines a left peripheral web, which is disposed to one side of the plenum enclosure. As embodied herein and shown in FIGS. 5 and 7 for example, a left peripheral web 102 is disposed adjacent and spaced from side portion 80 on the opposite side of plenum 72 as right peripheral plenum web 94 is disposed. As shown in FIG. 5 for example, one of the end edges of left peripheral web is connected to inner surface 88 of side portion 80 of the plenum at a third section 104 of the side portion, while the other end edge of the left peripheral web is connected to the side portion of the plenum at a fourth section 106 of the side portion. As shown in FIG. 7 for example, the elongated side edges of left peripheral web 102 are connected to the opposed inner surfaces 82, 86 of the plenum enclosure's bottom member 76 and mid member 78, respectively, so as to define an enclosed left peripheral plenum channel 108. Thus, in the embodiment shown in FIG. 7 for example, left peripheral plenum channel 108 is defined between left peripheral web 102, bottom member 76, mid member 78, and the segment of plenum side portion 80 that is defined between third section 104 and fourth section 106 of the plenum side portion. As shown in FIG. 5 for example, the portion of the plenum enclosure defined between right peripheral plenum channel 100 and left peripheral plenum channel 108 defines a middle plenum channel 112.

In still further accordance with the patient transfer apparatus of the present invention, a plenum opening is provided. As embodied herein and shown in FIGS. 5 and 6 for example, a plenum opening 120 preferably is defined through side portion 80 of the plenum enclosure and opens into middle plenum channel 112. Preferably two plenum openings 120, 122 are provided, one on each side of one end of the plenum. With this arrangement, regardless of which side of the patient's bed that patient transfer apparatus 20 is situated, the attendant will have convenient access to at least one of the two plenum openings 120, 122. Preferably, as shown in FIGS. 5 and 6 for example, each plenum opening 120 or 122 is disposed with its central axis of symmetry forming a 45° angle with the longitudinal centerline of plenum 72. With the exception of perforations 74 through the plenum enclosure and the plenum enclosure openings, the plenum enclosure is impervious to the passage of air.

In yet further accordance with the patient transfer apparatus of the present invention, at least one of the plenum webs defines a plenum dividing web. As embodied herein and shown in FIGS. 5 and 7 for example, each plenum dividing web 110 is disposed generally parallel to and between right peripheral plenum web 94 and left peripheral plenum web 102. Each plenum dividing web 110 can be disposed to divide middle plenum channel 112 into a pair of adjacent plenum support channels 114, 116 existing within middle channel 112 of plenum 72. Each plenum dividing web 110 has only one of its end edges connected to a fifth section 118 of plenum side portion 80's inner surface 88. Preferably, as shown in FIGS. 5 and 7 for example, only a single plenum dividing web 110 is provided. The end of plenum dividing web 110 which is opposite the end connected to fifth section 118, preferably is not connected to inner surface 88 of plenum side portion 80 and terminates spaced apart from inner surface 88 of plenum side portion 80. This enables air entering through either plenum opening 120 or 122 to fill both plenum support channels 114, 116 more readily and immediately than if air were required to pass through plenum web holes 92 in plenum dividing web 110 in order to fill the plenum support channel that was not in direct communication with the respective plenum opening 120 or 122 being used to fill plenum 72.

In one preferred embodiment of the disposition of plenum dividing web 110, plenum right peripheral web 94 and plenum left peripheral web 102, an arrangement is configured as shown for example in FIG. 5. In such FIG. 5 arrangement, the transverse distance between right peripheral web 94 and the opposed section of side portion 80 is about 4 inches when inflated. In such FIG. 5 arrangement, the transverse distance between left peripheral web 102 and the opposed section of side portion 80 is about 4 inches when inflated. In this same embodiment, the transverse distance between the right peripheral web 94 and the centrally disposed plenum dividing web 110 is about 6 inches when plenum 72 is fully inflated. In this same embodiment, the transverse distance between left peripheral web 102 and the centrally disposed plenum dividing web 110 is about 6 inches when plenum 72 is fully inflated.

In accordance with the patient transfer apparatus of the present invention, a plenum valve can be provided for each plenum opening. As embodied herein, the plenum valve preferably is a conventional check valve (not shown) which is disposed in the plenum opening. The check valve permits the plenum to be inflated by insertion of a suitable fitting into the check valve. When the fitting is removed, the check valve closes and prevents unwanted dust, particles, or other debris from gaining access to the plenum enclosure through the plenum opening. Accordingly, the plenum valve selectively controls access between the inside of the plenum and the environment of the patient transfer apparatus.

Alternatively to the provision of a plenum check valve for each plenum opening, the patient transfer apparatus of the present invention can include a plenum coupling and associated sealing cap for each plenum opening. As embodied herein and shown in FIGS. 1, 5, and 6 for example, a plenum coupling 124, 126 preferably is defined to surround a respective plenum opening 120, 122. As shown in FIG. 1 for example, a plenum sealing cap 128 can attach in air tight fashion to its associated coupling 126 and thereby covers plenum opening 122 and selectively controls access between middle plenum channel 112 and the environment of plenum 72. Each plenum sealing cap can include a threaded cap which can be screwed or twist locked onto the coupling's mating set of threads or twist lock configuration.

As noted above, in accordance with the patient transfer apparatus of the present invention, a plurality of perforations is defined through the bottom member of the plenum. As embodied herein and shown in FIGS. 6 and 7 for example, plenum perforations 74 are disposed to connect middle plenum channel 112, and plenum support channels 114 and 116 contained within middle channel 112, and right and left peripheral plenum channels 100, 108 respectively, with the atmosphere surrounding the plenum. As shown in FIG. 6 for example, the pattern of disposing the perforations in the bottom member is determined by the footprint (indicated by the diagonal dashed parallel lines) of support that is desired to enable the air bearing means to form an air bearing capable of reducing the friction between the plenum bottom member and its resting place. The reduction in friction must suffice to enable the patient transfer apparatus to slide over the surface forming the resting place of the patient transfer apparatus. Typically, the portion of the plenum bottom member defining the perforations will be that portion disposed away from the peripheral edges of the bottom member and toward the central region of the bottom member. However, as shown in FIGS. 6 and 7 for example, bottom member 76 also defines some perforations 74 into each of right peripheral plenum channel 100 and left peripheral plenum channel 108.

In an embodiment such as shown in FIG. 6 in which bottom member 76 is defined by a generally rectangular-shaped area measuring about 70 inches by 20 inches, the pattern of perforations preferably forms a square grid pattern. As shown in the expanded view portion of FIG. 6 for example, the square pattern of perforations 74 is arranged so that the centers of adjacent perforations 74 are separated on the side portions of the square (not the diagonal distances) by a linear distance that typically is about 0.375 inches (three-eighths of an inch). Moreover, as noted above, each such perforation 74 typically would have a diameter of about 0.030 inches. The pattern of perforations in such an embodiment would cover an area of about 696 square inches. The area through which perforations are provided, is shaped as one rectangle measuring 16 inches by 36 inches adjacent the end of a second rectangle measuring 10 inches by 12 inches. Both rectangular shaped areas are symmetrically disposed about the longitudinal centerline of bottom member 76. Furthermore, when such an embodiment of the plenum is supplied with enough air to transfer a patient weighing about 180 pounds, about 50 to 60 cubic feet of air per minute (CFM) would be exiting plenum 72 through perforations 74 in bottom member 76.

One type of device which could benefit from a patient transfer apparatus is a fluidized patient support. Examples of fluidized patient support systems are disclosed in U.S. Pat. Nos. 3,428,973 to Haroest et al, 4,483,029 to Paul, 4,564,965 to Goodwin, 4,599,755 to Tominaoa, and 4,637,083 to Goodwin, which are hereby incorporated herein by reference. As shown schematically in FIGS. 1, 8, and 10 for example, such fluidized patient support systems typically include a rigid tank 130 which holds the fluidizable material comprising a mass of tiny silicon beads (not shown) having diameters on the order of about 50 to 150 microns. The patient typically is supported at a height which is below the upper edge 132 (FIG. 8) of tank 130. When the beads are defluidized, the level of patient support resides still further below uppermost edge 132 of tank 130. Patients which reside in such fluidized patient support structures often have very delicate skin conditions, as would patients suffering from severe burns or bed sores for example. Thus, transfer of the patient from the fluidized patient support must be effected with a minimum of stress being placed on the skin of the patient. Since the upper edge of the rigid tank is disposed at a height higher than the level of the beads in the fluidized patient support, special care must be taken to avoid contact with the tank edge when transferring the patient into or out of the patient support.

In further accordance with the patient transfer apparatus of the present invention, means are provided for bridging the edge of the tank which contains the mass of fluidizable material of the fluidized patient support. As embodied herein and shown in FIGS. 1 and 10 for example, the bridging means preferably includes a rigid elongated member indicated generally by the designating numeral 134. As shown in FIG. 1 for example, the bridging means defines a planar surface on two opposite sides of rigid member 134. As shown in phantom (dashed line) in FIG. 10 for example, a pair of elongated rib members !36 are disposed on one of the planar surfaces of rigid elongated member 134. As shown in FIG. 1 for example, each rib member 136 is raised above the level of the planar surface on which the rib member is secured. Each rib member 136 is disposed to extend in the direction of elongation of rigid elongated member 134. Moreover, rib members 136 are disposed parallel to each other and spaced apart near the longitudinal centerline of rigid elongated member 134. The spacing between parallel rib members 136 should be greater than the thickness of free edge 132 of tank 130 to be bridged.

Figure 10:
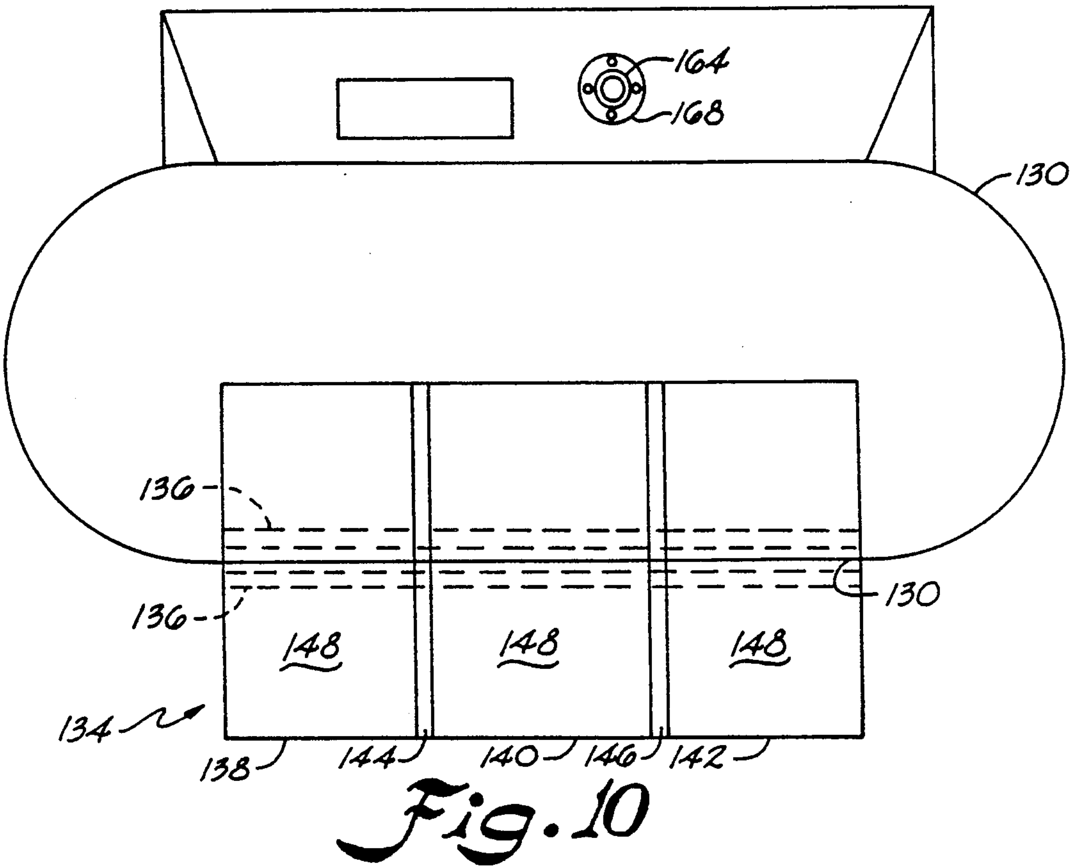
FIG. 10 illustrates a schematic top plan view of components of an embodiment of the present invention used in conjunction with a fluidized patient support system shown schematically from a top plan view.

In an alternative embodiment of the bridging means such as shown in FIGS. 1 and 10 for example, rigid elongated member 134 is formed in at least two segments 138 and 140 that are joined by a flexible joint !44 which extends transversely relative to the longitudinal axes of the segments comprising rigid elongated member 134. Preferably, a plurality of rigid, flat panels 138, 140, and 142 are disposed side-by-side and completely encapsulated in a flexible material such as a laminate vinyl-synthetic fabric cover 148 sold under the tradename STAPHCHEK ® by Herculite Products, Inc. of New York, N.Y. Such cover material has an antibacterial agent. Rigid panels 138, 140, 142 are preferably formed of a shatterproof board such as LEXAN™ brand material or a material of equivalent rated strength and durability. In a preferred embodiment, the opposed edges of adjacent board segments typically are separated by about one inch. All of the sharp edges of the board are removed. A foam insert can be inserted between the adjacent edges of the rigid boards in the side-by-side arrangement. In addition, the peripheral seams of the encapsulating material forming the cover can be welded, as can the perimeters of the portions of the encapsulating material which form separate compartments for enclosing each individual board. The welded seams disposed between adjacent boards, form the flexible hinges that enable the bridging means to be folded up for storage. Moreover, foam inserts can be provided around the peripheral edges of the rigid boards. Furthermore, a fabric cloth of nylon twill can be disposed on one side of the full length of the encapsulated boards and can be secured to the boards by snaps. The snaps typically are provided along one of the planar surfaces of each board near a single free edge thereof. In this segmented board embodiment, each rib member can terminate at points which are coextensive with the edges of each individual board segment. Each rib member can be formed of a closed cell foam or a natural rubber. In one embodiment shown in FIGS. 1 and 10 for example, three rigid panels 138, 140, 142 are provided, and typical dimensions of each rib member are about one inch wide by about one-half inch thick by about 16 inches long.

During operation of the bridging means, rigid member 134 is inserted beneath bottom member 76 of transfer apparatus 20 so that free edge 132 of tank 130 is disposed between the spacing which exists between parallel rib members 136. When the air bearing is activated by supplying pressurized air to plenum 72, transfer apparatus 20 can slide across the upper planar surface of rigid member 134. As transfer apparatus 20 moves toward the edge of rigid member 134 disposed hanging outside of free edge 132 of tank 130, rigid member 134 can be tilted toward a waiting gurney or the like. During the transfer operation, including the tilting motion, rib members 136 maintain free edge 132 between the spacing between rib members 136, thus facilitating safe and secure use of free edge 132 as a fulcrum for tilting rigid member 134.

In still further accordance with the patient transfer apparatus of the present invention, means are provided for selectively connecting one of the bladder and the plenum to a source of pressurized air. As embodied herein and shown in FIGS. 1, 8, 9, and 10 for example, the selective connecting means preferably includes a flexible hose 150, a plenum coupling 124, 126 secured around each plenum opening 120, 122, a bladder coupling 152 secured to bladder valve 66, and a first fitting 154 that is secured to one end of hose 150. As shown in FIGS. 1 and 9 for example, first fitting 154 preferably is configured so as to be removably and separately connectable in air tight fashion to each of plenum couplings 124, 126 and bladder coupling 152. A plurality of twist and lock threads 156 can be provided for example.

In still further accordance with the patient transfer apparatus of the present invention, the selective connecting means also can include a diverter valve for diverting the flow of pressurized air from a fluidized patient support apparatus to an outlet of the diverter valve. As embodied herein and indicated generally in FIG. 8 by the designating numeral 158, a diverter valve 158 is connected between a source of pressurized air, such as a blower 160, and an air distribution plenum 162 disposed beneath tank 130 of a fluidized patient support system. As shown in FIG. 10 for example, a diverter valve coupling 164 also is required in this embodiment and is secured to the outlet of the diverter valve. In addition and as shown for example in FIG. 9, a diverter valve fitting 166 is secured to the opposite end of flexible hose 150.

Figure 8:
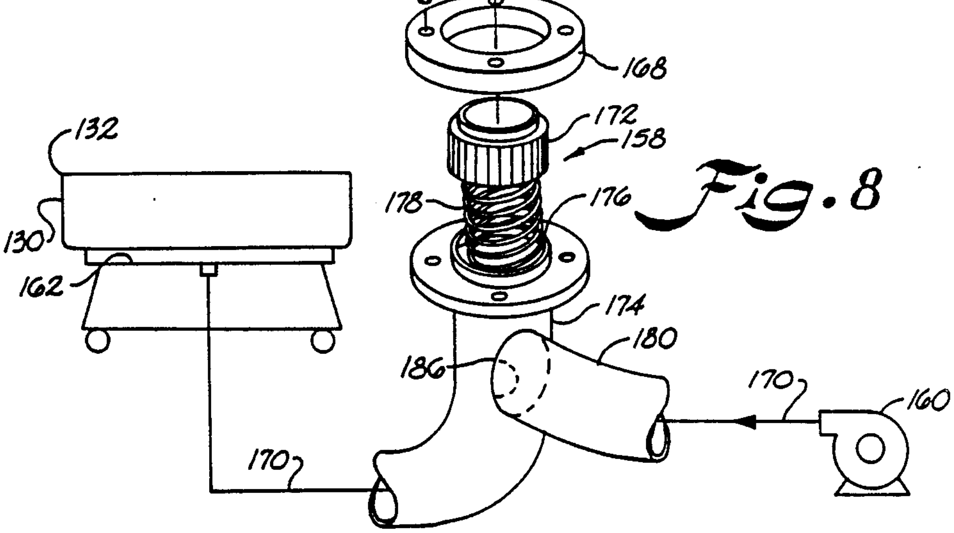
FIG. 8 illustrates a perspective schematic view of embodiments of components of an embodiment of the present invention.
Figure 9:
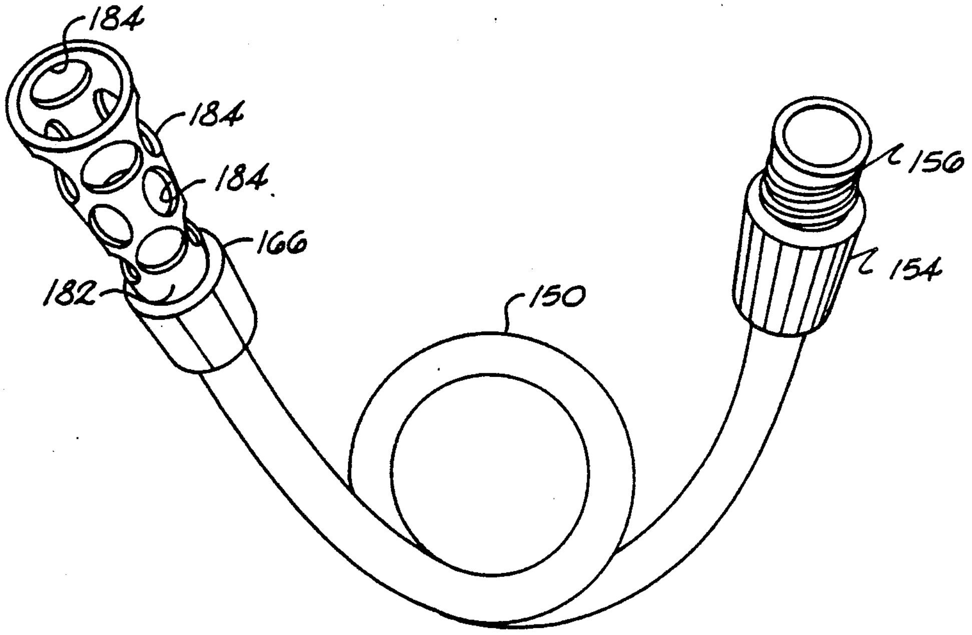
FIG. 9 illustrates a perspective view of embodiments of components of an embodiment of the present invention.

As embodied herein and shown in FIGS. 8 and 10 for example, the diverter valve includes a retaining ring 168 for mounting the diverter valve to a wall of the fluidized patient support apparatus. As shown schematically in FIG. 8 for example, diverter valve 158 is mounted preferably on the fluidized patient support apparatus in the vicinity of a conduit 170 which leads from the source of pressurized air to an air distribution plenum 162 disposed beneath a diffuser board which supports the mass of fluidizable material in the fluidized patient support apparatus. As shown in FIG. 8 for example, diverter valve 158 also preferably includes a spring-loaded piston 172 slidably disposed in a tube 174 connected at an outlet end 176 to retaining ring 168 and forming a central branch of a valve body. As shown in FIG. 8 for example, the opposite end of central branch 174 is connected to air distribution plenum 162 of the fluidized patient support apparatus. A spring 178 can be disposed in tube 174 so as to bias piston 172 toward outlet 176 of tube 174. As shown in FIG. 8 for example, the valve body also can define a second tube branch 180 which is connected at one end to conduit 170 leading to the source of pressurized air (such as blower 160) for the fluidized patient support apparatus. The opposite end of second branch 180 is disposed between outlet end 176 of central branch 174 and the opposite end of the central branch which connects to air distribution plenum 162 of the fluidized patient support.

In addition, diverter valve fitting 166 is configured to activate diverter valve 158 so as to divert the flow of pressurized air from the fluidizing air source (such as blower 160 for example) of a fluidized patient support apparatus that is connected to the diverter valve, to an outlet of the diverter valve upon insertion of the diverter valve fitting into the diverter valve. As shown in FIG. 9 for example, diverter valve fitting 166 includes an elongated tube 182 which has a plurality of large openings 184 defined transversely through the wall of tube 182 relative to the central longitudinal axis of elongated tube 182. Spring 178 normally biases piston 172 to a position between outlet 176 of tube 174 and the opening 186 of second branch 180 into tube 174. When diverter valve fitting tube 182 is inserted into the opening defined by the retaining ring 168, the free end of tube 182 displaces piston 172 against a resilient biasing mechanism, such as spring 178, so as to move piston 172 past the opening 186 of second branch 180 into central branch 174 and dispose large openings 184 in fitting tube 182 so that these large openings are in communication with opening 186 of second branch 180 into central branch 174. So disposed, piston 172 prevents air from the pressurized source from travelling to plenum 162 of the fluidized patient support apparatus and diverts this pressurized air to outlet 176 of diverter valve 158. Thus, the source of pressurized air is connected to flexible hose 150 via the opening 186 of second branch 180 into central branch 174 and openings 184 in the wall of diverter valve fitting tube 182.

Diverter valve fitting 166 is configured to be removably connectable to diverter valve coupling 164 in air tight fashion. Diverter valve fitting 166 also is configured so that it selectively can be either locked into diverter valve coupling 164 defined in or attached to retaining ring 168, and thus prevented from withdrawing from same, or unlocked from the coupling of the retaining ring and withdrawn from same, as desired.

In yet further accordance with the patient transfer apparatus of the present invention, means are provided for positively securing a patient above the exterior surface of the bladder. As embodied herein and shown in FIG. 1 for example, the positive patient securement means preferably includes at least a first strap 188 that has one end secured to the exterior of the bladder. A second strap 190 also has one end secured to the exterior of the bladder. The sites for securing the ends of the straps to the exterior of the bladder are disposed preferably opposite one another along the elongated sides of the top member of the bladder. Preferably, the free ends of the straps each contain securement means, such as hook and loop-type fasteners 192, so as to be securable to each other.

In yet further accordance with the patient transfer apparatus of the present invention, means are provided for manual gripping and lifting of the patient transfer apparatus when the patient is being transferred by the apparatus. The manual gripping and lifting means preferably is secured to the bladder and is configured to easily and comfortably accommodate the grip of a human hand. As embodied herein and shown in FIG. 1 for example, the manual gripping and lifting means preferably includes at least one handle 194 that defines a flexible member. The handles can be made of such flexible strong material as cloth, heavy canvas, vinyl, etc. As shown in FIG. 1 for example, opposite ends of the flexible member defining the handle are secured preferably where the bladder joins to the plenum. In this way, the flexible member defines a generally semicircular shape. Preferably, two such handles 194 are provided along each elongated side of the patient transfer apparatus.

The operation of an embodiment of the patient transfer apparatus of the present invention now will be described. As shown in FIG. 1 for example, apparatus 20 is disposed beneath the patient to be transferred. This can be done by manually rolling the patient to one side, and sliding the uninflated, and thus flat, patient transfer apparatus beneath the patient, with the bladder facing the patient and the plenum perforations facing the patient support surface. The patient 22 can be secured to the exterior surface of top member 28 of bladder 26 by connecting hook and loop fasteners 192 of oppositely disposed straps 188, 190. Twist and lock threads 156 of first fitting 154 are inserted into bladder valve 66 and locked in air tight fashion to bladder valve coupling 152. Tube 182 of diverter valve fitting 166 at one end of flexible hose 150 is inserted into diverter valve 158 past retaining ring 168, and fitting 166 is locked to diverter valve coupling 164, which is shown in FIG. 10 for example. Air is diverted from air distribution plenum 162 of fluidized patient support apparatus 24 to flexible hose 150, which supplies this pressurized air to inflate bladder 26. As shown in FIGS. 2–4 for example, the arrows indicate the direction of air flowing into bladder 26 as bladder 26 is being inflated. The path of least resistance directs the air initially to fill peripheral bladder chamber 58 so as to form a bolster around the perimeter of bladder 26. This ensures that the patient is not suddenly jostled toward the perimeter of the bladder while the air is filling bladder support channels 62 via air flow through bladder web holes 52. Once the bladder has been inflated to a pressure of about 2 psi, it is sufficiently rigid to perform the patient transfer operation. The blower of the fluidized patient support can be turned off, or diverter valve fitting 166 can be removed from diverter valve 158. Twist and lock threads 156 are unlocked from bladder coupling 152, and first fitting 154 is withdrawn from bladder valve 66. The withdrawal of first fitting 154 closes off bladder opening 64 due to the biasing of bladder valve spring 70 against bladder valve head 68, as is conventional in the operation of check valves such as bladder valve 66.

If the pressure inside the bladder is too high, the operator's finger or a blunt instrument can be used to push bladder valve head 68 against bladder valve spring 70 so as to release some air from bladder 26. If the patient is going to be supported on bladder 26 for any length of time, it is desirable to use bladder check valve 66 to adjust the pressure inside bladder 26 to a therapeutic pressure of about 8 to 10 inches of standard water.

In some embodiments, a sealing cap 128 will need to be removed from the desired plenum coupling before first fitting 154 can be secured to one of the plenum couplings 124, 126. However, in other embodiments, each plenum opening 120, 122 will be fitted with a check valve so that insertion of first fitting 154 will open the check valve. In both cases, twist and lock threads 156 will become locked in air tight fashion to the respective plenum coupling 124, 126. Once first fitting 154 is secured in air tight fashion to one of the plenum couplings, diverter valve fitting 166 can be reintroduced into diverter valve 158 (and/or blower 160 can be turned on, if it had been turned off) to supply air under pressure to inflate plenum 72.

As shown by the arrows in FIGS. 5–7 for example, air flows into plenum 72 through plenum opening 120 for example and fills plenum support channels 114, 116 and plenum peripheral channels 100, 108 via plenum web holes 92. Air is then expelled under pressure from plenum 72 via plenum perforations 74 defined in bottom member 76 to form a layer of air beneath bottom member 76. This layer of air reduces the friction between bottom member 76 and the surface on which the patient transfer apparatus is supported. At this stage of the patient transfer operation, rigid member 134 can be inserted as described above. Handles 194 can be used by the operator to guide patient transfer apparatus 20 onto the upper surface of rigid member 134, which then can be manipulated as described above to effect transfer of the patient onto another patient support device. Alternatively, more than one operator can grasp handles 194 to lift patient transfer apparatus 20, being careful to disconnect flexible hose 150 once the air bearing is no longer required to be operative.

What is claimed is:

1. Apparatus for transferring a patient relative to a supporting surface, the apparatus comprising:

(a) a bladder of a sufficient size to support a supine or prone patient, (i) said bladder defining an enclosure impervious to air, (ii) a peripheral web member subdividing said enclosure into two separate chambers, (iii) the perimeter of one of said chambers surrounding at least about three quarters of the perimeter of said other of said chambers, (iv) said peripheral bladder web member further defining a plurality of holes through which air can pass between said two chambers, (v) said bladder further defining an opening into said surrounding bladder chamber, and (vi) whereby upon inflation of said bladder through said bladder opening, the inflating fluid enters and pressurizes said surrounding bladder chamber prior to pressurizing the surrounded chamber, thereby forming an inflated boundary around the patient to guard against inadvertently rolling the patient off the transfer apparatus;

(b) a bladder valve, (i) said bladder valve covering said bladder opening, and (ii) said bladder valve selectively controlling access between said bladder surrounding chamber and the environment of the apparatus; and (c) means for defining an air bearing, said air bearing means being secured to one side of said bladder and outside said bladder enclosure, said air bearing means being adapted to reduce the friction between the patient transfer apparatus and its supporting surface to thereby facilitate the sliding of the patient transfer apparats relative to its supporting surface.

2. An apparatus as in claim 1, wherein:

(i) said holes defined through said peripheral web member being disposed in portions of said peripheral web member located away from the vicinity of said bladder opening.

3. An apparatus as in claim 1, further comprising:

(i) at least one bladder dividing web, and (ii) each said bladder dividing web having at least one of its end edges connected to said peripheral web member.

4. An apparatus as in claim 1, wherein:

(i) said peripheral web member forms a closed loop, and (ii) said surrounding web chamber completely surrounds said other of said two bladder chambers.

5. An apparatus as in claim 4, further comprising:

(i) at least one bladder dividing web, and (ii) wherein each said bladder dividing web being disposed to divide said surrounded chamber into a pair of adjacent bladder support channels within said surrounded chamber.

6. An apparatus as in claim 5, wherein:

(i) a plurality of bladder dividing webs extend between opposed sections of said peripheral bladder web member, (ii) each said bladder dividing web defining a pair of opposed end edges and having one of said end edges connected to a first section of said peripheral web member, (iii) each said bladder dividing web having the other of its end edges connected to a different section of said peripheral web member, and (iv) each said bladder dividing web defining a plurality of holes through which air can pass between adjacent ones of said bladder support channels.

7. An apparatus as in claim 1, wherein:

said air bearing means includes a plenum:

(i) said plenum defining an enclosure, (ii) said plenum enclosure defining a plurality of perforations through which air can pass from within said enclosure to the atmosphere surrounding the apparatus, (iii) said plenum further defining an opening through said plenum enclosure, and (iv) said plenum enclosure being impervious to air apart from air flowing through said plenum enclosure via said plenum enclosure perforations and said plenum enclosure opening.

8. An apparatus as in claim 7, further comprising:

(i) a right peripheral web being disposed to one side of said plenum enclosure opening and being connected to the inner surface of said plenum enclosure so as to define an enclosed right peripheral plenum channel, (ii) a left peripheral web being disposed on the opposite side of said plenum enclosure opening as said right peripheral web and being connected to the inner surface of said plenum enclosure so as to define an enclosed left peripheral plenum channel, (iii) a plurality of holes defined through each said right and left peripheral web, said holes being spaced apart from one another along the length of each said right and left peripheral web, and (iv) at least one plenum dividing web disposed between said right peripheral web and said left peripheral web, each said plenum dividing web defining a plurality of holes for allowing air to pass through said plenum dividing web.

9. An apparatus as in claim 7, further comprising:

(d) means for selectively connecting one of said bladder and said plenum to a source of pressurized air.

10. An apparatus as in claim 9, wherein:

said selective connecting means includes:

(i) a flexible hose, (ii) a plenum coupling secured around said plenum opening, (iii) a bladder coupling secured to said bladder valve, (iv) a first fitting secured to one end of said hose, said first fitting being configured to be removably and separately connectable to each of said plenum coupling and said bladder coupling.

11. An apparatus as in claim 10, wherein:

(i) said bladder valve includes a valve head, (ii) said valve head being resiliently biased to seal said bladder opening and being displaceable away from said bladder opening by insertion of said first fitting into said bladder valve.

12. An apparatus as in claim 10, wherein:

said selective connecting means includes:

(i) a diverter valve for diverting the flow of pressurized air from a fluidized patient support apparatus to an outlet of said diverter valve, (ii) a diverter valve coupling secured to said outlet of said diverter valve, (iii) a diverter valve fitting secured to the opposite end of said hose,
(iv) said diverter valve fitting being configured to be removably connectable to said diverter valve coupling,
(v) said diverter valve fitting being configured to activate said diverter valve to divert the flow of pressurized air from a fluidized patient support apparatus connected to the diverter valve, to an outlet of said diverter valve upon insertion of said diverter valve fitting into the diverter valve.

13. An apparatus as in claim 7, wherein:
(i) said plenum defining a mid member,
(ii) said plenum defining a bottom member,
(iii) said plenum defining a side portion,
(iv) each of said plenum mid member and said bottom member defining a flexible planar member,
(v) said plenum mid member being disposed opposite said bottom member,
(vi) said side portion extending between and joining said plenum mid member to said bottom member,
(vii) the inner surfaces of said plenum mid member, said bottom member, and said plenum side portion defining an enclosure within said plenum,
(viii) said plenum being impervious to air,
(ix) said plenum being impervious to liquid,
(x) said inner surface of said plenum mid member and said inner surface of said bottom member forming opposed inside surfaces of said plenum enclosure,
(xi) said plenum enclosure further defining a plurality of webs,
(xii) each said plenum web defining an elongated planar member,
(xiii) each said elongated planar member of each said plenum web defining a pair of opposed elongated side edges and a pair of opposed end edges extending between and joining said elongated side edges,
(xiv) each of said end edges being shorter than each of said elongated side edges,
(xv) each said plenum web extending between and being joined to said inner surface of said plenum mid member and said inner surface of said bottom member,
(xvi) one of said elongated side edges of each said plenum web being connected to said inner surface of said bottom member and the other of said elongated side edges of each said plenum web being connected to said inner surface of said mid member,
(xvii) one of said plenum webs defining a right peripheral web,
(xviii) said right peripheral web being disposed to one side of said plenum enclosure,
(xix) one of said end edges of said right peripheral web being connected to said side portion at one section of said side portion,
(xx) the other of said end edges of said right peripheral web being connected to said side portion at a second section of said side portion,
(xxi) said right peripheral web being spaced from and adjacent said side portion and defining a right peripheral plenum channel between said right peripheral web, said bottom member, said mid member, and said side portion between said first and second sections of said side portion,
(xxii) another one of said plenum envelope webs defining a left peripheral web,
(xxiii) said left peripheral web being disposed to the opposite side of said plenum enclosure as said right peripheral web,
(xxiv) one of said end edges of said left peripheral web being connected to said side portion at a third section of said side portion,
(xxv) the other of said end edges of said left peripheral web being connected to said side portion at a fourth section of said side portion,
(xxvi) said left peripheral web being spaced from and adjacent said side portion and defining a left peripheral plenum channel between said left peripheral web, said bottom member, said mid member and said side portion between said third and fourth sections of said side portion,
(xxvii) yet another of said plenum webs defining a plenum dividing web,
(xxviii) said plenum dividing web being disposed between said right peripheral web and said left peripheral web and having at least one of its end edges connected to said side portion at a fifth section of said side portion,
(xxix) each said plenum web further defining a plurality of perforations through said elongated planar member of each said plenum web, and
(xxx) said portion of said plenum enclosure defined between said right peripheral plenum channel and said left peripheral plenum channel further defining a middle plenum channel,
(xxxi) said plenum further defining an opening into said middle plenum channel,
(xxxii) said plenum further defining a plurality of perforations defined through said bottom member, and
(xxxiii) said bottom member perforations being disposed into said middle plenum channel.

14. An apparatus as in claim 13, wherein:
a unitary member defines said plenum mid member, said plenum bottom member, and said plenum side portion.

15. An apparatus as in claim 7, further comprising:
(d) a plenum coupling,
(i) said plenum coupling being defined around said plenum opening; and
(e) a plenum sealing cap,
(i) said sealing cap being configured to be removably securable to said plenum coupling in air tight fashion to selectively control access between the inside of said plenum and the environment of the apparatus.

16. An apparatus as in claim 7, further comprising:
(d) a plenum valve,
(i) said plenum valve defining a check valve,
(ii) said plenum valve being disposed in said plenum opening to cover said plenum opening, and
(iii) said plenum valve selectively controlling access between the inside of said plenum and the environment of the apparatus.

17. An apparatus as in claim 16, further comprising:
(e) a plenum coupling,
(i) said plenum coupling being defined around said plenum opening; and
(f) a plenum sealing cap,
(i) said sealing cap being configured to be removably securable to said plenum coupling.

18. An apparatus as in claim 1, further comprising:

means for bridging the edge of a tank containing the mass of fluidizable material of a fluidized patient support.

19. An apparatus as in claim 18, wherein:

said bridging means includes:

(i) a rigid elongated member defining a planar surface on opposite sides of said rigid member, (ii) a pair of elongated rib members disposed on one of said planar surfaces, (iii) each said rib member being raised above the level of said planar surface on which said rib member is disposed, (iv) said rib members being disposed to extend in the direction of elongation of said rigid member, (v) said rib members being disposed parallel to each other and spaced apart near the centerline of said rigid member, and (vi) said spacing between said rib members being greater than the thickness of the free edge of the tank to be bridged.

20. An apparatus as in claim 19, wherein:

(i) said elongated rigid member being formed in at least two segments joined in a flexible joint extending transversely relative to said elongated rigid member, and (ii) each said rib member terminating at said flexible joint and extending only to each side of said flexible joint.

21. An apparatus as in claim 1, further comprising:

(d) means for positively securing a patient above the exterior surface of said bladder.

22. An apparatus as in claim 21, wherein:

said positive patient securement means includes:

(i) at least a first strap having one end secured to the exterior of said bladder, (ii) at least a second strap having one end secured to the exterior of said bladder, (iii) the opposite ends of said straps being securable to each other.

23. An apparatus as in claim 1, further comprising:

(d) means for manual gripping and lifting of the apparatus, said manual gripping and lifting means being secured to said bladder and being configured to easily and comfortably accommodate the grip of a human hand.

24. An apparatus as in claim 23, wherein:

said manual gripping and lifting means includes:

(i) at least one handle defining a flexible member having opposite ends secured where said bladder joins to said plenum, said handle defining a generally semicircular shape.

25. An apparatus as in claim 1, wherein:

(i) said bladder defining a top member, (ii) said bladder defining a mid member, (iii) said bladder defining a side portion, (iv) said mid member being disposed opposite said top member, (v) side portion extending between and joining said top member to said mid member, (vi) each of said top member and said mid member defining a flexible planar member, (vii) said flexible planar member of said top member defining an interior surface opposite an exterior surface, (viii) said flexible planar member of said mid member defining an interior surface, (ix) said side portion defining an interior surface, (x) said interior surfaces of said top member, said mid member, and said side portion joining to define an enclosure within said bladder, (xii) said bladder being impervious to liquid, (xiii) said bladder further defining a plurality of webs, (xiv) each said bladder web defining an elongated planar member, (xvi) each said elongated planar member defining a pair of opposed elongated side edges, (xvii) each said elongated planar member defining a pair of opposed end edges extending between and joining said elongated side edges, (xviii) each of said end edges being shorter than each of said elongated side edges, (xix) each said bladder web extending between and being joined to said interior surface of said top member and said interior surface of said mid member, (xx) one of said elongated side edges of each said bladder web being connected to said interior surface of said top member and the other of said elongated side edges of each said bladder web being connected to said interior surface of said mid member, (xxi) one of said bladder webs defining a peripheral web, (xxii) said peripheral web being disposed spaced from and adjacent said side portion, (xxiii) said peripheral web defining a peripheral bladder channel between said peripheral web, said side portion, said top member, and said mid member, and (xxvii) said bladder opening being defined through said side portion.

26. An apparatus as in claim 25, wherein:

a unitary member defines said bladder top member, said bladder mid member, and said bladder side portion.

27. Apparatus for transferring a patient, the apparatus comprising:

(a) a bladder, (i) said bladder defining a top member, (ii) said bladder defining a mid member, (iii) said bladder defining a side portion, (iv) said mid member being disposed opposite said top member, (v) said side portion extending between and joining said top member to said mid member, (vi) each of said top member and said mid member defining a flexible planar member, (vii) said flexible planar member of said top member defining an interior surface opposite an exterior surface, (viii) said flexible planar member of said mid member defining an interior surface, (ix) said side portion defining an interior surface, (x) said interior surfaces of said top member, said mid member, and said side portion joining to define an enclosure within said bladder, (xi) said bladder being impervious to air, (xii) said bladder being impervious to liquid, (xiii) said bladder further defining a plurality of webs, (xiv) each said bladder web defining an elongated planar member, (xv) each said bladder web further defining a plurality of perforations through said elongated planar member, (xvi) each said elongated planar member defining a pair of opposed elongated side edges, (xvii) each said elongated planar member defining a pair of opposed end edges extending between and joining said elongated side edges, (xviii) each of said end edges being shorter than each of said elongated side edges, (xix) each said bladder web extending between and being joined to said interior surface of said top member and said interior surface of said mid member, (xx) one of said elongated side edges of each said bladder web being connected to said interior surface of said top member and the other of said elongated side edges of each said bladder web being connected to said interior surface of said mid member, (xxi) one of said bladder webs defining a peripheral web, (xxii) said peripheral web being disposed spaced from and adjacent said side portion, (xxiii) said peripheral web defining a peripheral bladder channel between said peripheral web, said side portion, said top member, and said mid member, (xxiv) at least one of said bladder webs defining a bladder dividing web, (xxv) each said bladder dividing web having at least one of its end edges connected to said peripheral web, (xxvi) said bladder further defining an opening into said bladder channel, and (xxvii) said bladder opening being defined through said side portion;

(b) a bladder valve, (i) said bladder valve covering said bladder opening, and (ii) said bladder valve selectively controlling access between said bladder channel and the environment of the apparatus, (iii) said bladder valve including a valve head, said valve head being biased to seal said bladder opening;

(c) a plenum, (i) said plenum being disposed adjacent said bladder mid member, (ii) said plenum defining a mid member, (ii) said plenum defining a bottom member, (iii) said plenum defining a side portion, (iv) each of said plenum mid member and said bottom member defining a flexible planar member, (v) said flexible planar member of said plenum mid member defining an inner surface, (vi) said flexible planar member of said bottom member defining an inner surface opposite an exterior surface, (vii) said side portion defining an inner surface, (viii) said plenum mid member being disposed opposite said bottom member, (ix) said side portion extending between and joining said plenum mid member to said bottom member, (x) said inner surfaces of said plenum mid member, said bottom member, and said plenum side portion defining an enclosure within said plenum, (xi) said plenum being impervious to air, (xii) said plenum being impervious to liquid, (xiii) said inner surface of said plenum mid member and said inner surface of said bottom member forming opposed inside surfaces of said plenum enclosure, (xiv) said plenum enclosure further defining a plurality of webs, (xv) each said plenum web defining an elongated planar member, (xvi) each said elongated planar member of each said plenum web defining a pair of opposed elongated side edges and a pair of opposed end edges extending between and joining said elongated side edges, (xvii) each of said end edges being shorter than each of said elongated side edges, (xviii) each said plenum web extending between and being joined to said inner surface of said plenum mid member and said inner surface of said bottom member, (xix) one of said elongated side edges of each said plenum web being connected to said inner surface of said bottom member and the other of said elongated side edges of each said plenum web being connected to said inner surface of said mid member, (xx) one of said plenum webs defining a right peripheral web, (xxi) said right peripheral web being disposed to one side of said plenum enclosure, (xxii) one of said end edges of said right peripheral web being connected to said side portion at one section of said side portion, (xxiii) the other of said end edges of said right peripheral web being connected to said side portion at a second section Of said side portion, (xxiv) said right peripheral web being spaced from and adjacent said side portion and defining a right peripheral plenum channel between said right peripheral web, said bottom member, said mid member, and said side portion between said first and second sections of said side portion, (xxv) another one of said plenum enclosure webs defining a left peripheral web, (xxvi) said left peripheral web being disposed to the opposite side of said plenum enclosure as said right peripheral web, (xxvii) one of said end edges of said left peripheral web being connected to said side portion at a third section of said side portion, (xxviii) the other of said end edges of said left peripheral web being connected to said side portion at a fourth section of said side portion, (xxix) said left peripheral web being spaced from and adjacent said side portion and defining a left peripheral plenum channel between said left peripheral web, said bottom member, said mid member and said side portion between said third and fourth sections of said side portion, (xxx) yet another of said plenum webs defining a plenum dividing web, (xxxi) said plenum dividing web being disposed between said right peripheral web and said left peripheral web and having at least one of its end edges connected to said side portion at a fifth section of said side portion, (xxxii) each said plenum web further defining a plurality of evenly spaced apart holes through said elongated planar member of each said plenum web, (xxxiii) said portion of said plenum enclosure defined between said right peripheral plenum channel and said left peripheral plenum channel further defining a middle plenum channel, (xxxiv) said plenum further defining an opening into said middle plenum channel, (xxxv) said plenum opening being defined through said side portion, (xxxvi) said plenum further defining a plurality of perforations defined through said bottom member, and (xxiv) said bottom member perforations being disposed into said middle plenum channel; and (d) a plenum valve, (i) said plenum valve covering said plenum opening, and (ii) said plenum valve selectively controlling access between the inside of said plenum and the environment of the apparatus;

(e) means for positively securing a patient above said exterior surface of said bladder top member; and (f) means for accommodating manual gripping, said manual gripping accommodating means being secured to said bladder and being configured to easily and comfortably accommodate the grip of a human hand.

28. Apparatus for transferring a patient, the apparatus comprising:

(a) a topsheet, (i) said topsheet forming a first flexible planar member, (ii) said topsheet being impervious to air, (iii) said topsheet being impervious to liquid, (iv) said topsheet defining an exterior surface on one side of said first planar member, and (v) said topsheet defining an interior surface on the side of said first planar member opposite said exterior surface;

(b) a flexible midsheet, (i) said midsheet forming a second flexible planar member, (ii) said midsheet being impervious to air, (iii) said midsheet defining a top surface on one side of said second planar member, and (iv) said midsheet defining a bottom surface on the side of said second planar member opposite said top surface;

(c) wherein said topsheet and said midsheet are joined to form an inflatable bladder, (i) said interior surface of said topsheet and said top surface of said midsheet forming opposed inside surfaces of said bladder, (ii) said bladder further defining a plurality of webs, (iii) each said web defining an elongated planar member, (iv) each said elongated planar member defining a pair of opposed elongated side edges and a pair of opposed end edges extending between and joining said elongated side edges, (v) each of said end edges being shorter than each of said elongated side edges, (vi) each said web extending between and being joined to said interior surface of said topsheet and said top surface of said midsheet, (vii) one of said elongated side edges of each said web connecting to said interior surface of said topsheet and the other of said elongated side edges of each said web connecting to said top surface of said midsheet, (viii) one of said bladder webs defining a peripheral web, (ix) said peripheral web being disposed spaced from and adjacent where said topsheet and said midsheet are joined and defining a peripheral bladder channel between said peripheral web and said topsheet and said midsheet in the vicinity where said topsheet joins said midsheet to form said bladder, (x) at least one of said bladder webs defining a bladder dividing web, (xi) each said bladder dividing web having at least one of its end edges connected to said peripheral web, (xii) each said bladder web further defining a plurality of perforations through said elongated planar member, and (xiii) said bladder further defining an opening into said bladder channel;

(d) a bladder valve, (i) said bladder valve covering said bladder opening, and (ii) said bladder valve selectively controlling access between said bladder channel and the environment of the apparatus;

(e) means for positively securing a patient above said exterior surface of said topsheet of said bladder;

(f) means for accommodating manual gripping, said manual gripping accommodating means being secured to said bladder and being configured to easily and comfortably accommodate the grip of a human hand;

(g) a bottomsheet, (i) said bottomsheet forming a third flexible planar member, (ii) said bottomsheet being impervious to air, (iii) said bottomsheet being impervious to liquid, (iv) said bottomsheet defining an outer surface on one side of said third planar member, and (v) said bottomsheet defining an inner surface on the side of said planar member opposite said outer surface;

(h) wherein said bottomsheet and said midsheet are joined to form an envelope defining an inflatable plenum, (i) said inner surface of said bottomsheet and said bottom surface of said midsheet forming opposed inside surfaces of said plenum envelope, (ii) said plenum envelope further defining a plurality of webs, (iii) each said plenum envelope web defining an elongated planar member, (iv) each said elongated planar member defining a pair of opposed elongated side edges and a pair of opposed end edges extending between and joining said elongated side edges, (v) each of said end edges being shorter than each of said elongated side edges, (vi) each said plenum envelope web extending between and being joined to said inner surface of said bottomsheet and said bottom surface of said midsheet, (vii) one of said elongated side edges of each said plenum envelope web connecting to said inner surface of said bottomsheet and the other of said elongated side edges of each said plenum envelope web connecting to said bottom surface of said midsheet, (viii) one of said plenum envelope webs defining a right peripheral web, (ix) said right peripheral web being disposed to one side of said plenum envelope, (x) one of said end edges of said right peripheral web being connected to said bottomsheet and said midsheet at one section where said bottomsheet and said midsheet are joined, (xi) the other of said end edges of said right peripheral web being connected to said bottomsheet and said midsheet at a second section where said bottomsheet and said midsheet are joined, (xii) said right peripheral web being spaced from and adjacent where said bottomsheet and said midsheet are joined and defining a right peripheral plenum envelope channel between said right peripheral web and said bottomsheet and said midsheet in the vicinity where said bottomsheet joins said midsheet to form said plenum envelope, (xiii) another one of said plenum envelope webs defining a left peripheral web, (xiv) said left peripheral web being disposed to the opposite side of said plenum envelope, (xv) one of said end edges of said left peripheral web being connected to said bottomsheet and said midsheet at a third section where said bottomsheet and said midsheet are joined, (xvi) the other of said end edges of said left peripheral web being connected to said bottomsheet and said midsheet at a fourth section where said bottomsheet and said midsheet are joined, (xvii) said left peripheral web being spaced from and adjacent where said bottomsheet and said midsheet are joined and defining a left peripheral plenum envelope channel between said left peripheral web and said bottomsheet and said midsheet in the vicinity where said bottomsheet joins said midsheet to form said plenum envelope, (xviii) yet another of said plenum envelope webs defining a plenum envelope dividing web, (xix) said plenum envelope dividing web being disposed between said right peripheral web and said left peripheral web and having at least one of its end edges connected to said bottomsheet and said midsheet at a fifth section where said bottomsheet and said midsheet are joined, (xx) each said plenum envelope web further defining a plurality of perforations through said elongated planar member, and (xxi) said portion of said plenum envelope defined between said right peripheral plenum envelope channel and said left peripheral plenum envelope channel further defining a middle plenum envelope channel, (xxii) said plenum envelope further defining an opening into said middle plenum envelope channel, (xxiii) said plenum envelope further defining a plurality of perforations defined through said bottomsheet, (xxiv) said bottomsheet perforations being disposed into said middle plenum envelope channel; and (i) a plenum valve, (i) said plenum valve covering said plenum envelope opening, and (ii) said plenum valve selectively controlling access between the inside of said plenum envelope and the environment of the apparatus.

* * * * *